United States Patent
Shim et al.

(10) Patent No.: US 6,696,991 B2
(45) Date of Patent: Feb. 24, 2004

(54) CODING AND DECODING METHOD OF SUPPRESSING DC COMPONENT IN CODESTREAM

(75) Inventors: Jae-seong Shim, Seoul (KR); Ki-hyun Kim, Metropolitan (KR); Hyun-soo Park, Seoul (KR); Iqbal Mahboob, Gujranwala (PK); Kiu-hae Jung, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/160,082

(22) Filed: Jun. 4, 2002

(65) Prior Publication Data

US 2003/0039193 A1 Feb. 27, 2003

(30) Foreign Application Priority Data

Jun. 5, 2001 (KR) ......................................... 2001-31452

(51) Int. Cl.⁷ ............................................... H03M 7/00
(52) U.S. Cl. ........................................... 341/58; 341/59
(58) Field of Search .................................... 341/58, 59

(56) References Cited

U.S. PATENT DOCUMENTS 5,016,258 A * 5/1991 Tanaka et al. ................ 341/58
6,198,413 B1 * 3/2001 Widmer ....................... 341/59

* cited by examiner

Primary Examiner—Howard L. Williams
(74) Attorney, Agent, or Firm—Staas & Halsey LLP

(57) ABSTRACT

A code modulation and demodulation method includes removing a DC component of a code stream to be modulated when source data is recorded on an optical information storage medium and controlling a suppression of the DC component contained in the code stream when the source data is converted into a codeword to be recorded on an optical information storage medium. The method includes determining a control timing to suppress the DC component of the code stream to which the source data are converted, performing a code conversion at each control time for the DC component so that the code stream branches into a pair of branch code streams one of which extends in a direction where a running digital sum (RDS) of the code stream increases, and another one of which extends in the direction where the RDS of the code stream decreases, and selecting the path of the code stream that has a most bounded path around RDS '0' from the paths of the branch code streams each control time. By performing a regular DC suppression control when the source data is converted, and by selecting one of the branch code streams when the DC suppression control is performed, more DC components in the code stream can be effectively removed.

32 Claims, 28 Drawing Sheets

FIG. 2

| | LZ (EZ) | NUMBER | ADD | NUMBER | DELETE | NUMBER | TOTAL NUMBER (DUPLICATED) |
|---|---|---|---|---|---|---|---|
| MCG1 | 2≤LZ≤10 (0≤EZ≤8) | 177 | LZ=1 (0≤EZ≤8) | 83 | | | 260(4) |
| MCG2 | 1≤LZ≤9 (0≤EZ≤8) | 257 | | | | | 257(1) |
| MCG3 | 0≤LZ≤6 (0≤EZ≤8) | 360 | | | LZ=1 (0≤EZ≤8) | 83 | 277(21) |
| MCG4 | 0≤LZ≤2 (0≤EZ≤8) | 262 | | | | | 262(6) |

FIG. 3

| | LZ (EZ) | NUMBER | ADD | NUMBER | DELETE | NUMBER | TOTAL NUMBER |
|---|---|---|---|---|---|---|---|
| DCG1 | 2≤LZ≤10 (0≤EZ≤8) | 375 | LZ=1 (0≤EZ≤8) | 177 | | | 552 |
| DCG2 | 1≤LZ≤9 (0≤EZ≤8) | 546 | | | | | 546 |
| DCG3 | 0≤LZ≤6 (0≤EZ≤8) | 763 | | | LZ=1 (0≤EZ≤8) | 177 | 586 |
| DCG4 | 0≤LZ≤2 (0≤EZ≤8) | 556 | | | | | 556 |

FIG. 4

|  | LZ (EZ) | NUMBER | ADD | NUMBER | ADDITION 2 | NUMBER |  |
|---|---|---|---|---|---|---|---|
| ACG1 | LZ≠0 (9≤EZ≤10) | 5 | SURPLUS CODE OF MCG1 | 4 |  |  | 9 |
| ACG2 | LZ≠0 (9≤EZ≤10) | 5 | SURPLUS CODE OF MCG2 | 1 |  |  | 6 |
| ACG3 | LZ≠1 (9≤EZ≤10) | 5 | SURPLUS CODE OF MCG3 | 21 | 7≤LZ≤8 (0≤EZ≤8) | 15 | 41 |
| ACG4 | (9≤EZ≤10) | 7 | SURPLUS CODE OF MCG4 | 6 | 3≤LZ≤5 (0≤EZ≤8) | 85 | 98 |

FIG. 5A

| Data Symbol | MCG1 Code Word MSB  LSB | NCG | MCG2 Code Word MSB  LSB | NCG | MCG3 Code Word MSB  LSB | NCG | MCG4 Code Word MSB  LSB | NCG |
|---|---|---|---|---|---|---|---|---|
| 000 | 000100100000000 | 4 | 000100100000000 | 4 | 100100000000001 | 1 | 100100000000001 | 1 |
| 001 | 000010010000000 | 4 | 000100010000000 | 4 | 001001000000001 | 1 | 010010000000001 | 1 |
| 002 | 001000100100000 | 4 | 000100100100000 | 4 | 000000100000001 | 1 | 001001000000001 | 1 |
| 003 | 010001001000000 | 4 | 000000100000000 | 4 | 100000000100001 | 1 | 100100100000001 | 1 |
| 004 | 010000100100000 | 4 | 000000010000000 | 4 | 100000001000001 | 1 | 100010010000001 | 1 |
| 005 | 010000001001001 | 1 | 000000000100010 | 2 | 100100000000010 | 2 | 100001001000001 | 1 |
| 006 | 010000010010000 | 3 | 000100000000001 | 1 | 001001000000010 | 2 | 100000100100001 | 1 |
| 007 | 010000010010001 | 1 | 010010010000001 | 1 | 001000000000010 | 2 | 100100010000001 | 1 |
| 008 | 010010000010010 | 2 | 010001001000001 | 1 | 100100000010010 | 2 | 100010001000001 | 1 |
| 009 | 010010010000001 | 1 | 010000100100001 | 1 | 001001000010010 | 2 | 100001000100001 | 1 |
| 010 | 000001001000000 | 4 | 000010000000001 | 1 | 000100100010010 | 2 | 010010010000001 | 1 |
| 011 | 000000100100000 | 4 | 010001000100001 | 1 | 100000000010010 | 2 | 010001001000001 | 1 |
| 012 | 000000010010000 | 3 | 010001001000001 | 1 | 100000000100010 | 2 | 010000100100001 | 1 |
| 013 | 000000001001000 | 3 | 001001001000001 | 1 | 100100000000100 | 3 | 100000100100001 | 1 |
| 014 | 000000000100100 | 3 | 001000100100001 | 1 | 001001000000100 | 3 | 100100000000010 | 2 |
| 015 | 000000000100010 | 2 | 000000100000001 | 1 | 000100100000100 | 3 | 010010000000010 | 2 |
| 016 | 000000000100001 | 1 | 010010000100001 | 1 | 000000100010010 | 3 | 001001000000010 | 2 |
| 017 | 000000000010000 | 3 | 001001000100001 | 1 | 100000010010000 | 3 | 100100100000010 | 2 |
| 018 | 010001001000001 | 1 | 000100100100001 | 1 | 100000001001000 | 3 | 100010010000010 | 2 |
| 019 | 010001001000000 | 4 | 000000100000001 | 1 | 100000000100100 | 3 | 100001001000010 | 2 |
| 020 | 010010000000010 | 2 | 010001000000001 | 1 | 100000100010000 | 3 | 100000100100010 | 2 |
| 021 | 010000100100001 | 1 | 001001000000001 | 1 | 100000010001000 | 3 | 100000010010010 | 2 |
| 022 | 010001000100000 | 4 | 000100100000001 | 1 | 100000001000100 | 3 | 100100010000010 | 2 |
| 023 | 010010000000001 | 1 | 000010010000001 | 1 | 100000100010000 | 3 | 100010001000010 | 2 |
| 024 | 001100000100000 | 1 | 000000100100001 | 1 | 100000100001000 | 3 | 100000100100010 | 2 |
| 025 | 001001001000000 | 4 | 000000100100001 | 1 | 100000000100000 | 4 | 100000100010010 | 2 |
| 026 | 000000000010001 | 1 | 010001000000001 | 1 | 000100100000000 | 4 | 010010010000010 | 2 |
| 027 | 010010010000000 | 4 | 000100010000001 | 1 | 000010010000000 | 4 | 010001001000010 | 2 |
| 028 | 000010000000001 | 1 | 000100010000001 | 1 | 000001001000000 | 4 | 100100000010010 | 2 |
| 029 | 010000001001000 | 3 | 000010001000001 | 1 | 000000100100000 | 4 | 010010000010010 | 2 |
| 030 | 010010001000001 | 1 | 000001000100001 | 1 | 100010010000000 | 4 | 100000000010010 | 2 |
| 031 | 010000000100100 | 3 | 010000100000001 | 1 | 100001001000000 | 4 | 100000000100010 | 2 |
| 032 | 010001000100001 | 1 | 001000010000001 | 1 | 100000100100000 | 4 | 010000000010010 | 2 |
| 033 | 010000100010000 | 3 | 000100001000001 | 1 | 100100010000000 | 4 | 100000001000010 | 2 |
| 034 | 010000000010010 | 2 | 000010000100001 | 1 | 100100000001001 | 1 | 010000000100010 | 2 |
| 035 | 010000000001001 | 1 | 000000010000001 | 1 | 001001010000001 | 1 | 100100000000100 | 3 |
| 036 | 001001000000000 | 1 | 001000001000001 | 1 | 000100100001001 | 1 | 100000000001000 | 3 |
| 037 | 001000100000000 | 4 | 000100000100001 | 1 | 100000010010001 | 1 | 010000000000100 | 3 |
| 038 | 001000000000010 | 2 | 010000000100001 | 1 | 100000001001001 | 1 | 100000000010000 | 3 |
| 039 | 000100100000001 | 1 | 010000001000001 | 1 | 100000100010001 | 1 | 010000001000000 | 3 |
| 040 | 000100010000000 | 4 | 001000000100001 | 1 | 100000010001001 | 1 | 001000000000100 | 3 |
| 041 | 010000100010001 | 1 | 000000000100001 | 1 | 100010010000001 | 1 | 100100100000100 | 3 |
| 042 | 000010010000001 | 1 | 000000001000001 | 1 | 100001001000001 | 1 | 100010010000100 | 3 |
| 043 | 000000100010000 | 3 | 000000010000001 | 1 | 100000100100001 | 1 | 100001001000100 | 3 |
| 044 | 010010000100000 | 4 | 001000000000010 | 2 | 000100000000001 | 1 | 100000100100100 | 3 |
| 045 | 000001001000001 | 1 | 000100000000010 | 2 | 100010001000001 | 1 | 010000000010000 | 3 |
| 046 | 000000010001000 | 3 | 010010010000010 | 2 | 100000100100001 | 1 | 001000000001000 | 3 |
| 047 | 000000100100001 | 1 | 010001001000010 | 2 | 000010000000001 | 1 | 100100100000100 | 3 |
| 048 | 000000001000100 | 3 | 010000100100010 | 2 | 100100001000001 | 1 | 100100010000100 | 3 |
| 049 | 000000001000010 | 2 | 010000010010010 | 2 | 100010000100001 | 1 | 100010010001000 | 3 |
| 050 | 010010000001001 | 1 | 000010000000010 | 2 | 001001001000001 | 1 | 100010001000100 | 3 |
| 051 | 010010000000100 | 3 | 010010001000010 | 2 | 001001000100001 | 1 | 100100010010000 | 3 |
| 052 | 000010001000000 | 4 | 010001000100010 | 2 | 000001000000001 | 1 | 100100001001000 | 3 |
| 053 | 000100000000010 | 2 | 010000100010010 | 2 | 100100000100001 | 1 | 100100000100100 | 3 |
| 054 | 000010100100000 | 4 | 001000100100010 | 2 | 001001000100001 | 1 | 010010010010000 | 3 |
| 055 | 010000010001001 | 1 | 001001000100010 | 2 | 000100100100001 | 1 | 100000010010000 | 3 |
| 056 | 000001000010000 | 3 | 001000010010010 | 2 | 000100100000001 | 1 | 100000001001000 | 3 |
| 057 | 001001000100000 | 4 | 000001000000010 | 2 | 000010010000001 | 1 | 100000000100100 | 3 |
| 058 | 000000100001000 | 3 | 010010001000010 | 2 | 000000100100001 | 1 | 100000100010000 | 3 |
| 059 | 000000010000100 | 3 | 001001000000010 | 2 | 000000100100001 | 1 | 100000010001000 | 3 |
| 060 | 000000000010010 | 2 | 000100100000010 | 2 | 100010000000001 | 1 | 100000001000100 | 3 |

FIG. 5B

| Data Symbol | MCG1 Code Word MSB LSB | NCG | MCG2 Code Word MSB LSB | NCG | MCG3 Code Word MSB LSB | NCG | MCG4 Code Word MSB LSB | NCG |
|---|---|---|---|---|---|---|---|---|
| 061 | 001001000001001 | 1 | 000010010000010 | 2 | 001000100000001 | 1 | 010000010010000 | 3 |
| 062 | 001001000000100 | 3 | 000001001000010 | 2 | 000100010000001 | 1 | 010000001001000 | 3 |
| 063 | 010010010000010 | 2 | 000000100100010 | 2 | 000010001000001 | 1 | 010000000100100 | 3 |
| 064 | 001001001000001 | 1 | 000000010010010 | 2 | 000001000100001 | 1 | 001000100000000 | 4 |
| 065 | 000100100100000 | 4 | 010001000000010 | 2 | 100001000000001 | 1 | 010000100000000 | 4 |
| 066 | 001001000000010 | 2 | 001000100000010 | 2 | 001000010000001 | 1 | 001000010000000 | 4 |
| 067 | 010001001000010 | 2 | 000100010000010 | 2 | 000100001000001 | 1 | 100100100000000 | 4 |
| 068 | 001000100100001 | 1 | 000010001000010 | 2 | 000010000100001 | 1 | 100010010000000 | 4 |
| 069 | 000000100000000 | 4 | 000001000100010 | 2 | 100000100000001 | 1 | 100001001000000 | 4 |
| 070 | 000000010010001 | 1 | 000000100010010 | 2 | 001000001000001 | 1 | 100000100100000 | 4 |
| 071 | 010000100100010 | 2 | 010000100000010 | 2 | 000100000100001 | 1 | 100100010000000 | 4 |
| 072 | 001000010010001 | 1 | 001000010000010 | 2 | 100000010000001 | 1 | 100010001000000 | 4 |
| 073 | 010000010001000 | 3 | 000100001000010 | 2 | 001000000100001 | 1 | 100001000100000 | 4 |
| 074 | 010000010010010 | 2 | 000010000100010 | 2 | 100010010000010 | 2 | 010010010000000 | 4 |
| 075 | 001000001001001 | 1 | 000000100000010 | 2 | 100001001000010 | 2 | 010001001000000 | 4 |
| 076 | 010000001000100 | 3 | 010000000010010 | 2 | 100000100100010 | 2 | 010000100100000 | 4 |
| 077 | 000010000000010 | 2 | 010000000100010 | 2 | 100000010010010 | 2 | 100100001000000 | 4 |
| 078 | 000001000000001 | 1 | 001000000010010 | 2 | 000100000000010 | 2 | 100010000100000 | 4 |
| 079 | 001000010010000 | 3 | 010000001000010 | 2 | 100010001000010 | 2 | 010010001000000 | 4 |
| 080 | 010000000100010 | 2 | 001000000100010 | 2 | 100001000100010 | 2 | 010001000100000 | 4 |
| 081 | 010000000010001 | 1 | 000100000010010 | 2 | 100000100010010 | 2 | 001001001000000 | 4 |
| 082 | 010000000000100 | 3 | 010000010000010 | 2 | 000010000000010 | 2 | 100100000001001 | 1 |
| 083 | 000100100000010 | 2 | 001000010000010 | 2 | 100100001000010 | 2 | 100000000001001 | 1 |
| 084 | 001000001001000 | 3 | 000100000100010 | 2 | 100010000100010 | 2 | 100000000101001 | 1 |
| 085 | 000000001001001 | 1 | 000010000010010 | 2 | 100001000010010 | 2 | 010000001001001 | 1 |
| 086 | 001000000100100 | 3 | 000000001000010 | 2 | 001001001000010 | 2 | 010000000010001 | 1 |
| 087 | 010000100000000 | 4 | 010010000100010 | 2 | 001001000100010 | 2 | 001000000001001 | 1 |
| 088 | 001000000010010 | 2 | 001001000010010 | 2 | 001000010010010 | 2 | 100010010000001 | 1 |
| 089 | 001000000001001 | 1 | 000100100010010 | 2 | 000001000000010 | 2 | 100010010001001 | 1 |
| 090 | 010000000001000 | 3 | 000010010010010 | 2 | 000100100000010 | 2 | 100001001001001 | 1 |
| 091 | 000010010000010 | 2 | 000000010000010 | 2 | 000010010000010 | 2 | 001000000010001 | 1 |
| 092 | 010001000000001 | 1 | 010010000100010 | 2 | 000001001000010 | 2 | 100000010010001 | 1 |
| 093 | 010010001001000 | 3 | 010001000010010 | 2 | 000000100100010 | 2 | 100000001001001 | 1 |
| 094 | 010010001000010 | 2 | 001001000100010 | 2 | 100010000000010 | 2 | 100000100010001 | 1 |
| 095 | 000001001000010 | 2 | 001000100100010 | 2 | 001001000100010 | 2 | 100000010010001 | 1 |
| 096 | 001000100000001 | 1 | 000100100100010 | 2 | 000100010000010 | 2 | 010000010010001 | 1 |
| 097 | 010010000100100 | 3 | 000100010010010 | 2 | 000010001000010 | 2 | 010000001001001 | 1 |
| 098 | 010010000100001 | 1 | 000000100000010 | 2 | 000001000100010 | 2 | 100100001000001 | 1 |
| 099 | 000000100100010 | 2 | 010000000000100 | 3 | 000000100010010 | 2 | 100010000100001 | 1 |
| 100 | 000100010000001 | 1 | 010000000001000 | 3 | 100001000000010 | 2 | 010010001000001 | 1 |
| 101 | 001001001001000 | 3 | 001000000000100 | 3 | 001001000000010 | 2 | 010001000100001 | 1 |
| 102 | 000000010000000 | 4 | 010000000001000 | 3 | 000100001000010 | 2 | 001001001000001 | 1 |
| 103 | 001001000010010 | 2 | 001000000001000 | 3 | 000010000100010 | 2 | 100100010000001 | 1 |
| 104 | 000100100001001 | 1 | 000100000000100 | 3 | 000001000010010 | 2 | 100100100000001 | 1 |
| 105 | 000100100000100 | 3 | 010010010000100 | 3 | 100000001000010 | 2 | 010010001000001 | 1 |
| 106 | 010001000010000 | 3 | 010010010001000 | 3 | 001000000010010 | 2 | 001001000100001 | 1 |
| 107 | 000010001000001 | 1 | 010001000100100 | 3 | 100010010010010 | 2 | 100010010010001 | 1 |
| 108 | 010000100001000 | 3 | 001000000100000 | 3 | 100000010000010 | 2 | 010001000000001 | 1 |
| 109 | 001000010000000 | 4 | 000100000001000 | 3 | 001000000100010 | 2 | 001000100000001 | 1 |
| 110 | 010000001000010 | 2 | 000010000001000 | 3 | 000100000010010 | 2 | 100001000000001 | 1 |
| 111 | 010000000100001 | 1 | 010010000000100 | 3 | 100000010010010 | 2 | 010000100000001 | 1 |
| 112 | 001000000000100 | 3 | 001001000000100 | 3 | 001000001000010 | 2 | 001000010000001 | 1 |
| 113 | 000001000100001 | 1 | 000100100000100 | 3 | 000100000100010 | 2 | 100000100000001 | 1 |
| 114 | 001001000100100 | 3 | 000010010000100 | 3 | 000010000010010 | 2 | 010000010000001 | 1 |
| 115 | 010001000100010 | 2 | 000001001000100 | 3 | 000010010010010 | 2 | 001000010000001 | 1 |
| 116 | 000000100010001 | 1 | 000000100100100 | 3 | 100100100000010 | 2 | 100000010000001 | 1 |
| 117 | 000100100100100 | 3 | 010010000001000 | 3 | 100010000010010 | 2 | 010000100000001 | 1 |
| 118 | 010001000010001 | 1 | 010001000100100 | 3 | 001001000100010 | 2 | 100000010000001 | 1 |
| 119 | 000000010001001 | 1 | 001001000001100 | 3 | 010010100010010 | 2 | 010000001000001 | 1 |
| 120 | 000010000010000 | 3 | 001000100000100 | 3 | 000100100100010 | 2 | 001000000100001 | 1 |

FIG. 5C

| Data Symbol | MCG1 Code Word MSB　　　LSB | NCG | MCG2 Code Word MSB　　　LSB | NCG | MCG3 Code Word MSB　　　LSB | NCG | MCG4 Code Word MSB　　　LSB | NCG |
|---|---|---|---|---|---|---|---|---|
| 121 | 000000000100000 | 4 | 000100100001000 | 3 | 000100010010010 | 2 | 010000100100010 | 2 |
| 122 | 000100100010010 | 2 | 000100010000100 | 3 | 000000100000010 | 2 | 010000010010010 | 2 |
| 123 | 000010010001001 | 1 | 000010010001000 | 3 | 100000000001000 | 3 | 100100001000010 | 2 |
| 124 | 000100010000100 | 3 | 000010001000100 | 3 | 100000000010000 | 3 | 100010000100010 | 2 |
| 125 | 010000010000100 | 3 | 000001001001000 | 3 | 001000000000100 | 3 | 100001000010010 | 2 |
| 126 | 000100001000000 | 4 | 000001000100100 | 3 | 100010010000100 | 3 | 010010001000010 | 2 |
| 127 | 001000000100010 | 2 | 010000010010000 | 3 | 100001001000100 | 3 | 010001000100010 | 2 |
| 128 | 001000000010001 | 1 | 010000001001000 | 3 | 100000100100100 | 3 | 010000100010010 | 2 |
| 129 | 010000000010000 | 3 | 010000000100100 | 3 | 001000000001000 | 3 | 001001001000010 | 2 |
| 130 | 000001000001000 | 3 | 010000100010000 | 3 | 000100000000100 | 3 | 001000100100010 | 2 |
| 131 | 010000100010010 | 2 | 010000010001000 | 3 | 100010010001000 | 3 | 001000010010010 | 2 |
| 132 | 000000100000100 | 3 | 010000001000100 | 3 | 100010001000100 | 3 | 001001000000010 | 2 |
| 133 | 010000100010001 | 1 | 001000010010000 | 3 | 100001101001000 | 3 | 100010000000010 | 2 |
| 134 | 010010010001000 | 3 | 001000001001000 | 3 | 100001000100100 | 3 | 010001000000010 | 2 |
| 135 | 000000001000000 | 4 | 001000000100100 | 3 | 001000000010000 | 3 | 001000100000010 | 2 |
| 136 | 000010010010010 | 2 | 010001000010000 | 3 | 000100000001000 | 3 | 100001000000010 | 2 |
| 137 | 000001001001001 | 1 | 010000100010001 | 3 | 000001000000100 | 3 | 010000100000010 | 2 |
| 138 | 000001001000100 | 3 | 010000010000100 | 3 | 000010010000100 | 3 | 001000010000010 | 2 |
| 139 | 000100000010010 | 2 | 001000100010000 | 3 | 000001001000100 | 3 | 001000000010010 | 2 |
| 140 | 000100000001001 | 1 | 001000010001000 | 3 | 000000100100100 | 3 | 100010010010010 | 2 |
| 141 | 001000000001000 | 3 | 001000001000100 | 3 | 100100000001000 | 3 | 100000010000010 | 2 |
| 142 | 001001001000010 | 2 | 000100010010000 | 3 | 100010000000100 | 3 | 010000001000010 | 2 |
| 143 | 001001000100001 | 1 | 000100001001000 | 3 | 001001000001000 | 3 | 001000000100010 | 2 |
| 144 | 001000100010000 | 3 | 000100000100100 | 3 | 001001000000100 | 3 | 100100010010010 | 2 |
| 145 | 000000010010010 | 2 | 010010000010000 | 3 | 000100100001000 | 3 | 100000100000010 | 2 |
| 146 | 010001001001001 | 1 | 010001000001000 | 3 | 000100010000100 | 3 | 010010010010010 | 2 |
| 147 | 000100000000100 | 3 | 010000100000100 | 3 | 000010010001000 | 3 | 010000010000010 | 2 |
| 148 | 001000001000010 | 2 | 001001000100100 | 3 | 000010001000100 | 3 | 000100001000010 | 2 |
| 149 | 001000100010001 | 1 | 001001000001000 | 3 | 000001001001000 | 3 | 001001000010010 | 2 |
| 150 | 001000010001000 | 3 | 001000010000100 | 3 | 000001000100100 | 3 | 100100000100010 | 2 |
| 151 | 010000100000001 | 1 | 000100100010100 | 3 | 100000010000100 | 3 | 100010000010010 | 2 |
| 152 | 010010010000100 | 3 | 000100010001000 | 3 | 001000010010000 | 3 | 010010000100010 | 2 |
| 153 | 001000010010010 | 2 | 000100001000100 | 3 | 001000001001000 | 3 | 010001000100010 | 2 |
| 154 | 001000010001001 | 1 | 000010010010000 | 3 | 001000000100100 | 3 | 001001000100010 | 2 |
| 155 | 001000001000100 | 3 | 000010010001001 | 3 | 100001000010000 | 3 | 001001000000010 | 2 |
| 156 | 000010000100000 | 4 | 000010000100100 | 3 | 100001000001000 | 3 | 100001001001000 | 3 |
| 157 | 010000010000010 | 2 | 000000010010100 | 3 | 100000100000100 | 3 | 100001000100100 | 3 |
| 158 | 010000001000001 | 1 | 000000001001000 | 3 | 001000100010000 | 3 | 010010010000100 | 3 |
| 159 | 010000000100000 | 4 | 000000100100100 | 3 | 001000010000100 | 3 | 010001001001000 | 3 |
| 160 | 000100010010000 | 3 | 000000100010000 | 3 | 001000001000100 | 3 | 010000100100100 | 3 |
| 161 | 000000100100100 | 3 | 000000010001000 | 3 | 000100010010000 | 3 | 001000000010000 | 3 |
| 162 | 000100100100001 | 1 | 000000001000100 | 3 | 000100001001000 | 3 | 010010000000100 | 3 |
| 163 | 000100001001000 | 3 | 000001000010000 | 3 | 000100001000100 | 3 | 001001000000100 | 3 |
| 164 | 010001000000010 | 2 | 000000100001000 | 3 | 100100000010000 | 3 | 100100000001000 | 3 |
| 165 | 001000001000010 | 2 | 000000010000100 | 3 | 100010000001000 | 3 | 100010000000100 | 3 |
| 166 | 001000010000001 | 1 | 010010010010000 | 3 | 100001000100000 | 3 | 010010000001000 | 3 |
| 167 | 001000000100001 | 1 | 010010001001000 | 3 | 001001000010000 | 3 | 010001000000100 | 3 |
| 168 | 010010001000100 | 3 | 010010000100100 | 3 | 001001000100100 | 3 | 001001000001000 | 3 |
| 169 | 010001001000100 | 3 | 001001001001000 | 3 | 001000010000100 | 3 | 001000100000100 | 3 |
| 170 | 000000001000001 | 1 | 001001000100100 | 3 | 000100100010000 | 3 | 100001000010000 | 3 |
| 171 | 000100000100100 | 3 | 000100100100100 | 3 | 000100010001000 | 3 | 100000100001000 | 3 |
| 172 | 010010000001000 | 3 | 000010000010000 | 3 | 000100001000100 | 3 | 100000010000100 | 3 |
| 173 | 010010000010000 | 3 | 000001000001000 | 3 | 000010010010000 | 3 | 010000100010000 | 3 |
| 174 | 001000100000010 | 2 | 000000100000100 | 3 | 000010100100000 | 3 | 010000100010000 | 3 |
| 175 | 000100000100010 | 2 | 010010010001000 | 3 | 000010000100100 | 3 | 010000001000100 | 3 |
| 176 | 000100001000001 | 1 | 010010001000100 | 3 | 000001000010000 | 3 | 001000010010000 | 3 |
| 177 | 000100000010001 | 1 | 010001001001000 | 3 | 000000100001000 | 3 | 001000001001000 | 3 |
| 178 | 010001001001000 | 3 | 010001001001000 | 3 | 100100001001000 | 3 | 001000100100100 | 3 |
| 179 | 010000100100100 | 3 | 001001001000100 | 3 | 100100000100100 | 3 | 100010000010000 | 3 |
| 180 | 010001000000100 | 3 | 001000100100100 | 3 | 001001001001000 | 3 | 100001000001000 | 3 |

FIG. 5D

| Data Symbol | MCG1 Code Word MSB LSB | NCG | MCG2 Code Word MSB LSB | NCG | MCG3 Code Word MSB LSB | NCG | MCG4 Code Word MSB LSB | NCG |
|---|---|---|---|---|---|---|---|---|
| 181 | 000100010000010 | 2 | 000100000010000 | 3 | 001001000100100 | 3 | 100000100000100 | 3 |
| 182 | 000010000100001 | 1 | 000010000001000 | 3 | 000100100100100 | 3 | 010001000010000 | 3 |
| 183 | 010001000100100 | 3 | 000001000000100 | 3 | 000010000010000 | 3 | 010001000001000 | 3 |
| 184 | 000001000000010 | 2 | 010000000100000 | 4 | 000001000001000 | 3 | 010000010000100 | 3 |
| 185 | 000000010000010 | 2 | 000000000100000 | 4 | 000000100000100 | 3 | 001000100010000 | 3 |
| 186 | 000100010010001 | 1 | 000000001000000 | 4 | 100100001000100 | 3 | 001000010001000 | 3 |
| 187 | 010010000010001 | 1 | 010010010000000 | 4 | 100010010010000 | 3 | 001000001000100 | 3 |
| 188 | 010001000001000 | 3 | 010001001000000 | 4 | 100010001001000 | 3 | 100100000010000 | 3 |
| 189 | 000010001000010 | 2 | 010000100100000 | 4 | 100010000100100 | 3 | 100010000001000 | 3 |
| 190 | 000100001001001 | 1 | 010010001000000 | 4 | 001001001000000 | 3 | 100001000000100 | 3 |
| 191 | 010000100000100 | 3 | 010001000100000 | 4 | 001001000100100 | 3 | 010010000010000 | 3 |
| 192 | 000001000100010 | 2 | 001001001000000 | 4 | 000100000010000 | 3 | 010001000001000 | 3 |
| 193 | 000010000010010 | 2 | 001000100100000 | 4 | 000010000001000 | 3 | 010000100000100 | 3 |
| 194 | 000001000010001 | 1 | 010010000100000 | 4 | 000001000000100 | 3 | 001001000010000 | 3 |
| 195 | 000010000001001 | 1 | 001001000100000 | 4 | 100000010000000 | 4 | 001000100001000 | 3 |
| 196 | 001001001000100 | 3 | 000001001000000 | 4 | 100010001000000 | 4 | 001000010000100 | 3 |
| 197 | 001000000010000 | 3 | 000000100100000 | 4 | 100001000100000 | 4 | 010010001001000 | 3 |
| 198 | 001001000010000 | 3 | 001000100000000 | 4 | 100100001000000 | 4 | 010010000100100 | 3 |
| 199 | 000000100010010 | 2 | 000100010000000 | 4 | 100010000100000 | 4 | 001001001001000 | 3 |
| 200 | 010000100000010 | 2 | 000010001000000 | 4 | 001001001000000 | 4 | 001001000100100 | 3 |
| 201 | 000000010000001 | 1 | 000001000100000 | 4 | 001001001000000 | 4 | 100100100010000 | 3 |
| 202 | 010010001001001 | 1 | 010000100000000 | 4 | 100100000100000 | 4 | 100100010001000 | 3 |
| 203 | 001000100100100 | 3 | 001000010000000 | 4 | 001001000100000 | 4 | 100100001000100 | 3 |
| 204 | 000100000001000 | 3 | 000100010000000 | 4 | 000100100100000 | 4 | 100010010010000 | 3 |
| 205 | 001000010000010 | 2 | 000010001000000 | 4 | 000000100000000 | 4 | 100010001001000 | 3 |
| 206 | 010000010000001 | 1 | 010000010000000 | 4 | 001000100000000 | 4 | 100010000100100 | 3 |
| 207 | 000100000010000 | 3 | 001000001000000 | 4 | 000100010000000 | 4 | 010010010001000 | 3 |
| 208 | 010010000100010 | 2 | 000100000010000 | 4 | 000010000100000 | 4 | 010010001000100 | 3 |
| 209 | 010001000010010 | 2 | 010000001000000 | 4 | 000001000100000 | 4 | 010010001001000 | 3 |
| 210 | 000000100000001 | 1 | 001000000100000 | 4 | 001000010000000 | 4 | 010001000100100 | 3 |
| 211 | 010001000001001 | 1 | 010000010010001 | 1 | 000100001000000 | 4 | 001001001000100 | 3 |
| 212 | 001000100001000 | 3 | 010000100101001 | 1 | 000010010000000 | 4 | 001000100100100 | 3 |
| 213 | 001001000001000 | 3 | 010001000010001 | 1 | 100000100000000 | 4 | 100000000100000 | 4 |
| 214 | 000100001000010 | 2 | 010000010001001 | 1 | 001000001000000 | 4 | 100000001000000 | 4 |
| 215 | 001001001001001 | 1 | 001000100010001 | 1 | 000100000100000 | 4 | 010000000100000 | 4 |
| 216 | 001000001000001 | 1 | 001000001001001 | 1 | 100000010000000 | 4 | 001000100100000 | 4 |
| 217 | 000010000001000 | 3 | 010001000010001 | 1 | 001000000100000 | 4 | 100100000100000 | 4 |
| 218 | 000010000000100 | 3 | 010000100001001 | 1 | 100001000010001 | 1 | 010010000100000 | 4 |
| 219 | 000010001000010 | 2 | 001001000010001 | 1 | 100001000010001 | 1 | 001010000100000 | 4 |
| 220 | 000100000100001 | 1 | 001001000010001 | 1 | 001000010010001 | 1 | 100001000100000 | 4 |
| 221 | 000010000010001 | 1 | 000100010010001 | 1 | 001000001001001 | 1 | 010000010000000 | 4 |
| 222 | 000001000000100 | 3 | 000100001001001 | 1 | 100010000010001 | 1 | 001000001000000 | 4 |
| 223 | 001000010000100 | 3 | 010000010001001 | 1 | 100001000100001 | 1 | 100000010000000 | 4 |
| 224 | 000001000001001 | 1 | 010000000010001 | 1 | 001001000100001 | 1 | 010000001000000 | 4 |
| 225 | 010000010000000 | 4 | 001000000001001 | 1 | 001000010010001 | 1 | 001000000100000 | 4 |
| 226 | 001001000100010 | 2 | 001000100100010 | 1 | 000100001001001 | 1 | 100001000100001 | 1 |
| 227 | 001000100010010 | 2 | 000010000001001 | 1 | 000100001001001 | 1 | 100000100001001 | 1 |
| 228 | 001001000010001 | 1 | 010010001001001 | 1 | 100000000001001 | 1 | 010000100010001 | 1 |
| 229 | 001000100001001 | 1 | 010001001001001 | 1 | 100000000010001 | 1 | 010000010001001 | 1 |
| 230 | 000100100010000 | 3 | 000100000010001 | 1 | 001000000001001 | 1 | 001000010010001 | 1 |
| 231 | 001000100000100 | 3 | 000001000001001 | 1 | 100010010010001 | 1 | 001000001001001 | 1 |
| 232 | 000100010001000 | 3 | 010010000001001 | 1 | 100001001001001 | 1 | 100010000010001 | 1 |
| 233 | 001000000000000 | 4 | 001001000010001 | 1 | 001000000010001 | 1 | 100001000010001 | 1 |
| 234 | 000100001000100 | 3 | 000100100001001 | 1 | 000100000010001 | 1 | 010001000010001 | 1 |
| 235 | 000010010010000 | 3 | 000001010001001 | 1 | 100010010010001 | 1 | 010000100001001 | 1 |
| 236 | 000100000100000 | 4 | 000001001001001 | 1 | 100010001001001 | 1 | 001000100010001 | 1 |
| 237 | 000010000001001 | 3 | 010010100010001 | 1 | 000100000010001 | 1 | 001000010010001 | 1 |
| 238 | 010000001000000 | 4 | 010001000001001 | 1 | 000010000010001 | 1 | 100100010001001 | 1 |
| 239 | 000100100100010 | 2 | 001001000010001 | 1 | 000010010010001 | 1 | 100010010010001 | 1 |
| 240 | 000100010010010 | 2 | 001000100001001 | 1 | 000001001001001 | 1 | 100010001001001 | 1 |

FIG. 5E

| Data Symbol | MCG1 Code Word MSB        LSB | NCG | MCG2 Code Word MSB        LSB | NCG | MCG3 Code Word MSB        LSB | NCG | MCG4 Code Word MSB        LSB | NCG |
|---|---|---|---|---|---|---|---|---|
| 241 | 000100100010001 | 1 | 000100100010001 | 1 | 100100000010001 | 1 | 010010010001001 | 1 |
| 242 | 000100010001001 | 1 | 000100010001001 | 1 | 100010000001001 | 1 | 010001001001001 | 1 |
| 243 | 000010000100100 | 3 | 000100010010001 | 1 | 001001000010001 | 1 | 010010000001001 | 1 |
| 244 | 000100100001000 | 3 | 000010001001001 | 1 | 001000100001001 | 1 | 001001000001001 | 1 |
| 245 | 001000000100000 | 4 | 000000010010001 | 1 | 000100100010001 | 1 | 100100000010001 | 1 |
| 246 | 000010010010001 | 1 | 000000001001001 | 1 | 000100010001001 | 1 | 100010000001001 | 1 |
| 247 | 000000100000010 | 2 | 000000100010001 | 1 | 000010010010001 | 1 | 010010000010001 | 1 |
| 248 | 000010001001001 | 1 | 000000010001001 | 1 | 000010001001001 | 1 | 010001000001001 | 1 |
| 249 | 000100010000100 | 3 | 000010000010001 | 1 | 000000100010001 | 1 | 001001000010001 | 1 |
| 250 | 000001000010010 | 2 | 000000100001001 | 1 | 000000010001001 | 1 | 001000100010001 | 1 |
| 251 | 000010010001000 | 3 | 010010010010001 | 1 | 000000100001001 | 1 | 100100010010001 | 1 |
| 252 | 000010001000100 | 3 | 010010001001001 | 1 | 100100001001001 | 1 | 100100001001001 | 1 |
| 253 | 000001001001000 | 3 | 001001001001001 | 1 | 001001001001001 | 1 | 010010010010001 | 1 |
| 254 | 000000010000001 | 1 | 000010000010001 | 1 | 000010000010001 | 1 | 010010001001001 | 1 |
| 255 | 000001000100100 | 3 | 000001000001001 | 1 | 000001000001001 | 1 | 001001001001001 | 1 |

FIG. 6A

| Data Symbol | DCG11 Code Word MSB LSB | NCG | DCG12 Code Word MSB LSB | NCG | DCG21 Code Word MSB LSB | NCG | DCG22 Code Word MSB LSB | NCG |
|---|---|---|---|---|---|---|---|---|
| 000 | 00100100100000001 | 1 | 00100100000000001 | 1 | 01001001000000001 | 1 | 00100100000000001 | 1 |
| 001 | 00100010010000001 | 1 | 00010010000000001 | 1 | 01000100100000001 | 1 | 00010010000000001 | 1 |
| 002 | 00100001001000001 | 1 | 00001001000000001 | 1 | 01000010010000001 | 1 | 00001001000000001 | 1 |
| 003 | 00100000100100001 | 1 | 00000100100000001 | 1 | 01000001001000001 | 1 | 00000100100000001 | 1 |
| 004 | 00000100000000001 | 1 | 00000010010000001 | 1 | 01000000100100001 | 1 | 00000010010000001 | 1 |
| 005 | 00100100010000001 | 1 | 00000001001000001 | 1 | 01001000100000001 | 1 | 00000001001000001 | 1 |
| 006 | 00100010001000001 | 1 | 00000000100100001 | 1 | 01000100010000001 | 1 | 00000000100100001 | 1 |
| 007 | 00100001000100001 | 1 | 00100010000000001 | 1 | 01000010001000001 | 1 | 01000100000000001 | 1 |
| 008 | 00010010010000001 | 1 | 00010001000000001 | 1 | 01000001000100001 | 1 | 00100010000000001 | 1 |
| 009 | 00010010100000001 | 1 | 00100100100000001 | 1 | 00100100100000001 | 1 | 00010010000000001 | 1 |
| 010 | 00010000100100001 | 1 | 00000100010000001 | 1 | 00100010010000001 | 1 | 00001001000000001 | 1 |
| 011 | 00000010000000001 | 1 | 00000010001000001 | 1 | 00100001001000001 | 1 | 00000100010000001 | 1 |
| 012 | 00100100001000001 | 1 | 00000001000100001 | 1 | 00100000100100001 | 1 | 00000010001000001 | 1 |
| 013 | 00100010000100001 | 1 | 00100001000000001 | 1 | 00000100000000001 | 1 | 00000001000100001 | 1 |
| 014 | 00010010001000001 | 1 | 00010000100000001 | 1 | 01001000010000001 | 1 | 01000010000000001 | 1 |
| 015 | 00010001000100001 | 1 | 00001000010000001 | 1 | 01000100001000001 | 1 | 00100001000000001 | 1 |
| 016 | 00001001001000001 | 1 | 00000100001000001 | 1 | 01000010000100001 | 1 | 00010000100000001 | 1 |
| 017 | 00001000100100001 | 1 | 00000010000100001 | 1 | 00100100010000001 | 1 | 00001000010000001 | 1 |
| 018 | 00000001000000001 | 1 | 00100100100000001 | 1 | 00100010001000001 | 1 | 00000100001000001 | 1 |
| 019 | 00000000001000001 | 1 | 00100100100000001 | 1 | 00100001000100001 | 1 | 00000010000100001 | 1 |
| 020 | 00000000010000001 | 1 | 00010000010000001 | 1 | 00100100010000001 | 1 | 01001001001000001 | 1 |
| 021 | 00100100000100001 | 1 | 00000100100000001 | 1 | 00100010010000001 | 1 | 01001000100000001 | 1 |
| 022 | 00010010000100001 | 1 | 00000100000100001 | 1 | 00100010000100001 | 1 | 01000001000000001 | 1 |
| 023 | 00001001000100001 | 1 | 00100000000100001 | 1 | 00000100000000001 | 1 | 00100100100000001 | 1 |
| 024 | 00000100100100001 | 1 | 00100000001000001 | 1 | 01001000001000001 | 1 | 00100000100000001 | 1 |
| 025 | 00000000100000001 | 1 | 00010000000100001 | 1 | 01001000000000001 | 1 | 00010000010000001 | 1 |
| 026 | 00001000000000010 | 2 | 00100100000000010 | 2 | 00100100001000001 | 1 | 00001000001000001 | 1 |
| 027 | 00100100100000010 | 2 | 00010010000000010 | 2 | 00100100100000001 | 1 | 00000100000100001 | 1 |
| 028 | 00100100010000010 | 2 | 00001001000000010 | 2 | 00010010001000001 | 1 | 01001001000100001 | 1 |
| 029 | 00100001001000010 | 2 | 00000100100000010 | 2 | 00100001000100001 | 1 | 01001001010100001 | 1 |
| 030 | 00100000100100010 | 2 | 00000010010000010 | 2 | 00001001001000001 | 1 | 01000000100000001 | 1 |
| 031 | 00100000010010010 | 2 | 00000001001000010 | 2 | 00001000100100001 | 1 | 00100000010000001 | 1 |
| 032 | 00000100000000010 | 2 | 00000000100100010 | 2 | 00000001000000001 | 1 | 00010000001000001 | 1 |
| 033 | 00100100010000010 | 2 | 00000000010010010 | 2 | 00000000010000001 | 1 | 00001000100000001 | 1 |
| 034 | 00100100001000010 | 2 | 00100010000000010 | 2 | 01001000000100001 | 1 | 01000000000100001 | 1 |
| 035 | 00100001000100010 | 2 | 00010001000000010 | 2 | 00100100000100001 | 1 | 01000000001000001 | 1 |
| 036 | 00100000100010010 | 2 | 00001000100000010 | 2 | 00010010000100001 | 1 | 00100000000100001 | 1 |
| 037 | 00010010010000010 | 2 | 00000100010000010 | 2 | 00001001000100001 | 1 | 01000000010000001 | 1 |
| 038 | 00010010001000010 | 2 | 00000010001000010 | 2 | 00000100100100001 | 1 | 00100000001000001 | 1 |
| 039 | 00010010100100010 | 2 | 00000001000100010 | 2 | 00000000100000001 | 1 | 00010000000100001 | 1 |
| 040 | 00010000010010010 | 2 | 00000000100010010 | 2 | 01001001000000010 | 2 | 01001001000000010 | 2 |
| 041 | 00000001000000010 | 2 | 00100001000000010 | 2 | 01000100100000010 | 2 | 00100100000000010 | 2 |
| 042 | 00000000001000010 | 2 | 00010001000000010 | 2 | 01000010010000010 | 2 | 00010010000000010 | 2 |
| 043 | 00100100000010010 | 2 | 00001000010000010 | 2 | 01000001001000010 | 2 | 00001001000000010 | 2 |
| 044 | 00010100100000010 | 2 | 00000100001000010 | 2 | 01000000100100010 | 2 | 00000100100000010 | 2 |
| 045 | 00001001000010010 | 2 | 00000010000100010 | 2 | 01000000010010010 | 2 | 00000010010000010 | 2 |
| 046 | 00000100100010010 | 2 | 00000001000010010 | 2 | 00001000000000010 | 2 | 00000001001000010 | 2 |
| 047 | 00000100100100010 | 2 | 00100100100100010 | 2 | 01001000100000010 | 2 | 00000000100100010 | 2 |
| 048 | 00000000010000010 | 2 | 00010100010010010 | 2 | 01001000010010010 | 2 | 00000000010010010 | 2 |
| 049 | 00100100000100010 | 2 | 00100100100000010 | 2 | 01000100001000010 | 2 | 01000100000000010 | 2 |
| 050 | 00100010000010010 | 2 | 00010100100010010 | 2 | 01000001000100010 | 2 | 00100010000000010 | 2 |
| 051 | 00010010100000010 | 2 | 00010000010000010 | 2 | 01000000100010010 | 2 | 00010010000000010 | 2 |
| 052 | 00010001000010010 | 2 | 00010000001000010 | 2 | 00100100100100010 | 2 | 00001001000000010 | 2 |
| 053 | 00001001000100010 | 2 | 00000100000100010 | 2 | 00100001001000010 | 2 | 00000100010000010 | 2 |
| 054 | 00001000100010010 | 2 | 00000010000010010 | 2 | 00100000100100010 | 2 | 00000010001000010 | 2 |
| 055 | 00000100100100010 | 2 | 00100000000010010 | 2 | 00100000100100010 | 2 | 00000001000100010 | 2 |
| 056 | 00000100100010010 | 2 | 00100000000100010 | 2 | 00100000100100010 | 2 | 00000000100010010 | 2 |
| 057 | 00000001000000010 | 2 | 00010000000010010 | 2 | 00000100000000010 | 2 | 01000010000000010 | 2 |
| 058 | 00100100001000010 | 2 | 00100000001000010 | 2 | 01001000010000010 | 2 | 00100001000000010 | 2 |
| 059 | 00100010000100010 | 2 | 00010000000100010 | 2 | 01000100001000010 | 2 | 00010010000000010 | 2 |
| 060 | 00100001000010010 | 2 | 00001000000010010 | 2 | 01000010000100010 | 2 | 00001000010000010 | 2 |

FIG. 6B

| Data Symbol | DCG11 Code Word MSB LSB | NCG | DCG12 Code Word MSB LSB | NCG | DCG21 Code Word MSB LSB | NCG | DCG22 Code Word MSB LSB | NCG |
|---|---|---|---|---|---|---|---|---|
| 061 | 000100100001000010 | 2 | 001001001000010010 | 2 | 010000010000010010 | 2 | 000001000010000010 | 2 |
| 062 | 000100010000100010 | 2 | 001000100010010010 | 2 | 001001000100000010 | 2 | 000000100000100010 | 2 |
| 063 | 000100000100010010 | 2 | 001000000100000010 | 2 | 001000100001000010 | 2 | 000000001000010010 | 2 |
| 064 | 000010010001000010 | 2 | 000100000001000010 | 2 | 001000010000100010 | 2 | 010010010001000010 | 2 |
| 065 | 000010001001000010 | 2 | 000010000100000010 | 2 | 001000010000010010 | 2 | 010010001001000010 | 2 |
| 066 | 000010000100100010 | 2 | 000001000000010010 | 2 | 000100100010000010 | 2 | 010010000100010010 | 2 |
| 067 | 001000000000001000 | 3 | 001001000000000100 | 3 | 000100010001000010 | 2 | 010000010000000010 | 2 |
| 068 | 000100000000000100 | 3 | 000100100000000100 | 3 | 000100001001000010 | 2 | 001001001001000010 | 2 |
| 069 | 001000000000010000 | 3 | 000001001000000100 | 3 | 000100000100010010 | 2 | 001001000100010010 | 2 |
| 070 | 000100000000001000 | 3 | 000000100100000100 | 3 | 000000010000000010 | 2 | 001001000001000010 | 2 |
| 071 | 000010000000000100 | 3 | 000000010010000100 | 3 | 010010000001000010 | 2 | 000100010010010010 | 2 |
| 072 | 001001001000000100 | 3 | 000000001001000100 | 3 | 001001000000010010 | 2 | 000100000010000010 | 2 |
| 073 | 001001000010000100 | 3 | 000000000100100100 | 3 | 000100100000010010 | 2 | 000010000001000010 | 2 |
| 074 | 001000010001000100 | 3 | 001001000000000100 | 3 | 000010000001000010 | 2 | 000001000010000010 | 2 |
| 075 | 001000001000100100 | 3 | 001000100000000100 | 3 | 000000010000100010 | 2 | 000001000010000010 | 2 |
| 076 | 000100000000010000 | 3 | 000100100000001000 | 3 | 000000010000100010 | 2 | 010000100000010010 | 2 |
| 077 | 000010000000001000 | 3 | 000100010000000100 | 3 | 000000000010000010 | 2 | 010000010000100010 | 2 |
| 078 | 000010001000000100 | 3 | 000010001000001000 | 3 | 010010000001000010 | 2 | 001010000000010010 | 2 |
| 079 | 000010000010010000 | 3 | 000010001000100100 | 3 | 010001000000100010 | 2 | 010001000010000010 | 2 |
| 080 | 000000000001001000 | 3 | 000001001000001000 | 3 | 001010000001000010 | 2 | 001010000000100010 | 2 |
| 081 | 000000000100010000 | 3 | 000001001000001000 | 3 | 001000010000010010 | 2 | 000100000000010010 | 2 |
| 082 | 000000000001001000 | 3 | 000000100100001000 | 3 | 000100010000100010 | 2 | 010010010000010010 | 2 |
| 083 | 000000000001000100 | 3 | 000000010010001000 | 3 | 000100010000100010 | 2 | 010001000010000010 | 2 |
| 084 | 000000010000010000 | 3 | 000000010010001000 | 3 | 000010001000010010 | 2 | 010000100010010010 | 2 |
| 085 | 000000000100001000 | 3 | 000000001000100100 | 3 | 000010001000010010 | 2 | 010000000100010010 | 2 |
| 086 | 000000000010000100 | 3 | 001001000000010000 | 3 | 000001001000100010 | 2 | 001000000010000010 | 2 |
| 087 | 001001000010010000 | 3 | 001001000000001000 | 3 | 000000100001000010 | 2 | 001001000000010010 | 2 |
| 088 | 001001000001001000 | 3 | 001000010000010000 | 3 | 000001000100010010 | 2 | 000010000000010010 | 2 |
| 089 | 001000100000100100 | 3 | 000100010000010000 | 3 | 010010001000010010 | 2 | 001001001000010010 | 2 |
| 090 | 000100100100010000 | 3 | 000100010000010000 | 3 | 010001000000100010 | 2 | 001001000100010010 | 2 |
| 091 | 001001000010010000 | 3 | 000100010000010000 | 3 | 001000010000100010 | 2 | 001001000100010010 | 2 |
| 092 | 000100010000100100 | 3 | 000001001000010000 | 3 | 001001000001000010 | 2 | 010010000100010010 | 2 |
| 093 | 000010010010010000 | 3 | 000010000100001000 | 3 | 001001000000010010 | 2 | 010000010000100010 | 2 |
| 094 | 000010010001001000 | 3 | 000010000010000100 | 3 | 001000001000010010 | 2 | 001001000100010010 | 2 |
| 095 | 000001001000100100 | 3 | 000010000100100100 | 3 | 001000010010000010 | 2 | 001010001010010010 | 2 |
| 096 | 000001000010010000 | 3 | 000010000100001000 | 3 | 000010010000010010 | 2 | 001010000010000010 | 2 |
| 097 | 000000010000001000 | 3 | 000010000001000100 | 3 | 001000010010000010 | 2 | 001010000001000010 | 2 |
| 098 | 000000010000000100 | 3 | 000001000010010000 | 3 | 000001001001000010 | 2 | 000010000000100010 | 2 |
| 099 | 001001001000010000 | 3 | 000000100000010000 | 3 | 000010001001000010 | 2 | 000001000000010010 | 2 |
| 100 | 001001000010001000 | 3 | 000000100000100100 | 3 | 010000010000010000 | 3 | 010010000000000100 | 3 |
| 101 | 001001000001000100 | 3 | 001001000010010000 | 3 | 001000000000001000 | 3 | 001001000000000100 | 3 |
| 102 | 001001001001010000 | 3 | 001001000001001000 | 3 | 000100000000000100 | 3 | 000100100000000100 | 3 |
| 103 | 001000100001001000 | 3 | 001001000000100100 | 3 | 010010010000000100 | 3 | 000010010000000100 | 3 |
| 104 | 001000010000100100 | 3 | 001001000000010000 | 3 | 010001001000000100 | 3 | 000001001000000100 | 3 |
| 105 | 000100010010001000 | 3 | 001001000000100100 | 3 | 010000100010000100 | 3 | 000000100010000100 | 3 |
| 106 | 000100100001000100 | 3 | 001001000001000100 | 3 | 010000010010000100 | 3 | 000000001001000100 | 3 |
| 107 | 000100010001001000 | 3 | 000100000010010000 | 3 | 010000001001000100 | 3 | 000000000100100100 | 3 |
| 108 | 000100010000100100 | 3 | 000100010000001000 | 3 | 001000010000001000 | 3 | 010010000000001000 | 3 |
| 109 | 000010010001000100 | 3 | 000100000000100100 | 3 | 000100000000001000 | 3 | 010001000000000100 | 3 |
| 110 | 000010000100100100 | 3 | 001000010000010000 | 3 | 000010000000000100 | 3 | 001001000000001000 | 3 |
| 111 | 000001000000010000 | 3 | 001000000100001000 | 3 | 010010010000001000 | 3 | 001001000000000100 | 3 |
| 112 | 000000100000001000 | 3 | 001000000010000100 | 3 | 010001000100000100 | 3 | 000100100000001000 | 3 |
| 113 | 000000100001000100 | 3 | 000100100000010000 | 3 | 010001001000000100 | 3 | 000010001000000100 | 3 |
| 114 | 001001001000001000 | 3 | 000100000010001000 | 3 | 010000100010000100 | 3 | 000010001000000100 | 3 |
| 115 | 001001001000000100 | 3 | 000100000001000100 | 3 | 010000100010001000 | 3 | 000001000100000100 | 3 |
| 116 | 001001000010001000 | 3 | 000010000100010000 | 3 | 010000010001000100 | 3 | 000000100100001000 | 3 |
| 117 | 001000010001001000 | 3 | 000010000100001000 | 3 | 010000100010001000 | 3 | 000000100010001000 | 3 |
| 118 | 001000010001001000 | 3 | 000010000000100100 | 3 | 010000010000100100 | 3 | 000000010010001000 | 3 |
| 119 | 001000010001000100 | 3 | 001001001001000100 | 3 | 000100100100000100 | 3 | 000000010001000100 | 3 |
| 120 | 000100100010000100 | 3 | 001000100000010000 | 3 | 001000100010000100 | 3 | 000000010001001000 | 3 |

FIG. 6C

| Data Symbol | DCG11 Code Word MSB　　　LSB | NCG | DCG12 Code Word MSB　　　LSB | NCG | DCG21 Code Word MSB　　　LSB | NCG | DCG22 Code Word MSB　　　LSB | NCG |
|---|---|---|---|---|---|---|---|---|
| 121 | 00010001001000100 | 3 | 00100001000001000 | 3 | 00100001001000100 | 3 | 00000001000100100 | 3 |
| 122 | 00010001100100100 | 3 | 00100000100000100 | 3 | 00100000100100100 | 3 | 01001000000010000 | 3 |
| 123 | 00001000000010000 | 3 | 00010001000010000 | 3 | 00010000000010000 | 3 | 01000100000001000 | 3 |
| 124 | 00000100000001000 | 3 | 00010000100001000 | 3 | 00001000000001000 | 3 | 01000010000000100 | 3 |
| 125 | 00000010000000100 | 3 | 00010000010000100 | 3 | 00000100000000100 | 3 | 00100100000010000 | 3 |
| 126 | 00100000000000000 | 4 | 00000000001000000 | 4 | 00000000010010000 | 3 | 00100010000001000 | 3 |
| 127 | 00000100100000000 | 4 | 00000000010000000 | 4 | 00000000100010000 | 3 | 00100001000000100 | 3 |
| 128 | 00000010010000000 | 4 | 00100100100000000 | 4 | 00000000010001000 | 3 | 00010010000010000 | 3 |
| 129 | 00000001001000000 | 4 | 00100100010000000 | 4 | 00000001000010000 | 3 | 00010001000001000 | 3 |
| 130 | 00000000100100000 | 4 | 00100010001000000 | 4 | 00000000100001000 | 3 | 00010000100000100 | 3 |
| 131 | 00001000100000000 | 4 | 00100000100100000 | 4 | 00000000010000100 | 3 | 00001001000010000 | 3 |
| 132 | 00000100010000000 | 4 | 00100100010000000 | 4 | 01001000010010000 | 3 | 00001000100001000 | 3 |
| 133 | 00000010001000000 | 4 | 00100010001000000 | 4 | 01001000001001000 | 3 | 00001000010000100 | 3 |
| 134 | 00000001000100000 | 4 | 00100001000100000 | 4 | 01001000000100100 | 3 | 00000100100010000 | 3 |
| 135 | 00010000100000000 | 4 | 00010010010000000 | 4 | 00100100010010000 | 3 | 00000100010001000 | 3 |
| 136 | 00001000010000000 | 4 | 00010001001000000 | 4 | 00100100001001000 | 3 | 00000100001000100 | 3 |
| 137 | 00000100001000000 | 4 | 00010001000100000 | 4 | 00100100000100100 | 3 | 00000010010010000 | 3 |
| 138 | 00000010000100000 | 4 | 00100100001000000 | 4 | 00010010010010000 | 3 | 00000100001001000 | 3 |
| 139 | 00100100100100000 | 4 | 00100010000100000 | 4 | 00010010001001000 | 3 | 00000100000100100 | 3 |
| 140 | 00100000100000000 | 4 | 00010010001000000 | 4 | 00010010000100100 | 3 | 01000000010010000 | 3 |
| 141 | 00010000001000000 | 4 | 00010001000100000 | 4 | 00010001001001000 | 3 | 01000000001001000 | 3 |
| 142 | 00001000001000000 | 4 | 00001001001000000 | 4 | 00001001000100100 | 3 | 01000000000100100 | 3 |
| 143 | 00000100000100000 | 4 | 00001000100100000 | 4 | 00000100100100100 | 3 | 01000000100010000 | 3 |
| 144 | 00100100000100000 | 4 | 00100100000100000 | 4 | 00000010000010000 | 3 | 01000000010001000 | 3 |
| 145 | 00001000001000000 | 4 | 00010010000100000 | 4 | 00000001000001000 | 3 | 01000000001000100 | 3 |
| 146 | 00001000000100000 | 4 | 00001000000100000 | 4 | 00000000100000100 | 3 | 00100000010010000 | 3 |
| 147 | 00100000001000000 | 4 | 00000100100100000 | 4 | 01001000100010000 | 3 | 00100000001001000 | 3 |
| 148 | 00010000000100000 | 4 | 00000100100000000 | 4 | 01001000010001000 | 3 | 00100000000100100 | 3 |
| 149 | 01000000010010001 | 1 | 01001000010010001 | 1 | 01001000001000100 | 3 | 01000001000010000 | 3 |
| 150 | 01000000001001001 | 1 | 01001000001001001 | 1 | 01001000100010000 | 3 | 01000000100001000 | 3 |
| 151 | 01000001000010001 | 1 | 01001000100010001 | 1 | 01001000001001000 | 3 | 01000000010000100 | 3 |
| 152 | 01000000100001001 | 1 | 01001000010001001 | 1 | 01000100001001000 | 3 | 00100000100010000 | 3 |
| 153 | 01000001000010001 | 1 | 01000100100010001 | 1 | 00100100100010000 | 3 | 00100000010001000 | 3 |
| 154 | 01000000100001001 | 1 | 01000100001001001 | 1 | 00100100010001000 | 3 | 00100000001000100 | 3 |
| 155 | 01001001001001001 | 1 | 01000100000100001 | 1 | 00100100001000100 | 3 | 00010100100010000 | 3 |
| 156 | 01000010000010001 | 1 | 01001001000001001 | 1 | 00100010010010000 | 3 | 00010000001001000 | 3 |
| 157 | 01000001000001001 | 1 | 01000100100001001 | 1 | 00100010001001000 | 3 | 00010000000100100 | 3 |
| 158 | 01001000000010001 | 1 | 01000010010001001 | 1 | 00100010000100100 | 3 | 01001001001001000 | 3 |
| 159 | 01001000000010001 | 1 | 01000010001001001 | 1 | 00100100010001000 | 3 | 01001001000100100 | 3 |
| 160 | 01000100000001001 | 1 | 01001001000010001 | 1 | 00010010001000100 | 3 | 01000100100100100 | 3 |
| 161 | 01000100000010001 | 1 | 01001000100010001 | 1 | 00010010010010000 | 3 | 01000010000010000 | 3 |
| 162 | 01000010000001001 | 1 | 01001000010001001 | 1 | 00010010010010000 | 3 | 01000001000001000 | 3 |
| 163 | 01001001000000001 | 1 | 01000010000000001 | 1 | 00001001001000100 | 3 | 01000000100000100 | 3 |
| 164 | 01000100100000001 | 1 | 01000010000000001 | 1 | 00001000100100100 | 3 | 00100001000010000 | 3 |
| 165 | 01000010010000001 | 1 | 01001001001000001 | 1 | 00000100000010000 | 3 | 00100000100001000 | 3 |
| 166 | 01000001001000001 | 1 | 01001000100100001 | 1 | 00000010000001000 | 3 | 00010000010000100 | 3 |
| 167 | 01000000100100001 | 1 | 01000100100000001 | 1 | 00000001000000100 | 3 | 00010001000100100 | 3 |
| 168 | 01001000100000001 | 1 | 01001001000100001 | 1 | 01001001000010000 | 3 | 00010001000001000 | 3 |
| 169 | 01000100010000001 | 1 | 01000100100100001 | 1 | 01001000100001000 | 3 | 00010000001000100 | 3 |
| 170 | 01000010001000001 | 1 | 01000100010000001 | 1 | 01001000010000100 | 3 | 00010000100100100 | 3 |
| 171 | 01000001000100001 | 1 | 01000010000100001 | 1 | 01000100100010000 | 3 | 00001000001001000 | 3 |
| 172 | 01001000010000001 | 1 | 01000001001000001 | 1 | 01001000100100000 | 3 | 00001000000100100 | 3 |
| 173 | 01001000001000001 | 1 | 01000010010000001 | 1 | 01001000100100100 | 3 | 01001001001001000 | 3 |
| 174 | 01001001000000010 | 2 | 01001000000000010 | 2 | 01000010010010000 | 3 | 01001001100100100 | 3 |
| 175 | 01001001100000010 | 2 | 01000100000000010 | 2 | 01000010001001000 | 3 | 01001000000010000 | 3 |
| 176 | 01000010010000010 | 2 | 01000010000000010 | 2 | 01000010000100100 | 3 | 01000010000001000 | 3 |
| 177 | 01001001001000010 | 2 | 01001001001000010 | 2 | 00100100100010000 | 3 | 01000001000000100 | 3 |
| 178 | 01000001100100010 | 2 | 01001001100100010 | 2 | 00100100100010000 | 3 | 00100100100100100 | 3 |
| 179 | 01000000010010010 | 2 | 01001000010010010 | 2 | 00100100010001000 | 3 | 00100100000010000 | 3 |
| 180 | 01001000100000010 | 2 | 01000001000000010 | 2 | 00100010001000100 | 3 | 00100001000001000 | 3 |

FIG. 6D

| Data Symbol | DCG11 Code Word MSB LSB | NCG | DCG12 Code Word MSB LSB | NCG | DCG21 Code Word MSB LSB | NCG | DCG22 Code Word MSB LSB | NCG |
|---|---|---|---|---|---|---|---|---|
| 181 | 0100010001000010 | 2 | 0100000000010010 | 2 | 0010000100100100 | 3 | 0010000010000100 | 3 |
| 182 | 0100010001000010 | 2 | 0100000000100010 | 2 | 0010000100010100 | 3 | 0001000100010000 | 3 |
| 183 | 0100001000100010 | 2 | 0100000001000010 | 2 | 0001001001000100 | 3 | 0001000100001000 | 3 |
| 184 | 0100000100010010 | 2 | 0101001001000010 | 2 | 0001000100100100 | 3 | 0001000000100000 | 3 |
| 185 | 0100100010000010 | 2 | 0100010010010010 | 2 | 0001000010010100 | 3 | 0000100010000010 | 3 |
| 186 | 0100010001000010 | 2 | 0100001001010010 | 2 | 0000100000010000 | 3 | 0000100000100000 | 3 |
| 187 | 0100100000010010 | 2 | 0100000010000010 | 2 | 0000010000001000 | 3 | 0000100001000100 | 3 |
| 188 | 0100100000100010 | 2 | 0101001001000100 | 2 | 0000001000000100 | 3 | 0000010010010000 | 3 |
| 189 | 0100010000010010 | 2 | 0101001000100010 | 2 | 0100000000100000 | 4 | 0100000100100000 | 4 |
| 190 | 0100100001000010 | 2 | 0100010010010010 | 2 | 0100000001000000 | 4 | 0100000100100000 | 4 |
| 191 | 0100001000000010 | 2 | 0100010001010010 | 2 | 0010000000100000 | 4 | 0100000010010000 | 4 |
| 192 | 0100100010001010 | 2 | 0100010010000010 | 2 | 0000000100010000 | 4 | 0100000010001000 | 4 |
| 193 | 0100000000010000 | 3 | 0100100000000100 | 3 | 0000000101000000 | 4 | 0100000100100000 | 4 |
| 194 | 0100100100000100 | 3 | 0100100000001000 | 3 | 0000000100100000 | 4 | 0100000100010000 | 4 |
| 195 | 0100010010000100 | 3 | 0100010000000100 | 3 | 0000010100000000 | 4 | 0010010010000000 | 4 |
| 196 | 0100001001000100 | 3 | 0100100000010000 | 3 | 0000001001000000 | 4 | 0010001001000000 | 4 |
| 197 | 0100000100100100 | 3 | 0100100000010000 | 3 | 0000001010000000 | 4 | 0010010000100000 | 4 |
| 198 | 0100000010010100 | 3 | 0100001000000100 | 3 | 0000010001000000 | 4 | 0101000010000000 | 4 |
| 199 | 0100100100010000 | 3 | 0100001000010000 | 3 | 0000010010000000 | 4 | 0100010001000000 | 4 |
| 200 | 0100100100000100 | 3 | 0100000001010000 | 3 | 0000001000010000 | 4 | 0100000100000100 | 4 |
| 201 | 0100100010010000 | 3 | 0100000000100100 | 3 | 0100100100000000 | 4 | 0010010010000000 | 4 |
| 202 | 0100100010001001 | 3 | 0100000010010000 | 3 | 0100100010000000 | 4 | 0010010010000000 | 4 |
| 203 | 0100100100100100 | 3 | 0100000010010000 | 3 | 0010010100100000 | 4 | 0010010010000000 | 4 |
| 204 | 0100100100010000 | 3 | 0100000001010010 | 3 | 0001000000100000 | 4 | 0001000100010000 | 4 |
| 205 | 0100100100001000 | 3 | 0100001000010000 | 3 | 0000100000100000 | 4 | 0001000100010000 | 4 |
| 206 | 0100100100000100 | 3 | 0100000101010000 | 3 | 0000010001000000 | 4 | 0000010010010000 | 4 |
| 207 | 0100010010010000 | 3 | 0100000010001000 | 3 | 0101010010000100 | 4 | 0101000010010000 | 4 |
| 208 | 0100010010010000 | 3 | 0101001001001000 | 3 | 0100000100000100 | 4 | 0100010000100000 | 4 |
| 209 | 0100010000010000 | 3 | 0101001010010010 | 3 | 0010000000100000 | 4 | 0010010000100000 | 4 |
| 210 | 0100100100010000 | 3 | 0100000100100100 | 3 | 0001000000100000 | 4 | 0010010000100000 | 4 |
| 211 | 0101001000010100 | 3 | 0100000010010000 | 3 | 0000010000000100 | 4 | 0010010010000000 | 4 |
| 212 | 0101000010000100 | 3 | 0100000100010000 | 3 | 0100000100100000 | 4 | 0001001000100000 | 4 |
| 213 | 0100100100010000 | 3 | 0100000010000100 | 3 | 0010010010010000 | 4 | 0010010010010000 | 4 |
| 214 | 0100010001001000 | 3 | 0100100100100100 | 3 | 0001000000100000 | 4 | 0000010010010000 | 4 |
| 215 | 0100010001000100 | 3 | 0101001000100100 | 3 | 0100000001001001 | 1 | 0100000000010001 | 1 |
| 216 | 0100001001010000 | 3 | 0100010000010000 | 3 | 0100000000100001 | 1 | 0010000000001001 | 1 |
| 217 | 0100100010010000 | 3 | 0100010000010000 | 3 | 0100000100010001 | 1 | 0100000000010001 | 1 |
| 218 | 0100000100001001 | 3 | 0101001000010100 | 3 | 0100000010001001 | 1 | 0001000000001001 | 1 |
| 219 | 0100000000100000 | 4 | 0100010010000000 | 4 | 0010000010010001 | 1 | 0101000100001001 | 1 |
| 220 | 0100000001000000 | 4 | 0100001001000000 | 4 | 0010000001001001 | 1 | 0100010010001001 | 1 |
| 221 | 0100100100100000 | 4 | 0100000100100000 | 4 | 0100000100000101 | 1 | 0101000010001001 | 1 |
| 222 | 0101000101000100 | 4 | 0101000100100000 | 4 | 0100000010000001 | 1 | 0101000001001001 | 1 |
| 223 | 0101001000100000 | 4 | 0101000100100000 | 4 | 0010000100010001 | 1 | 0001000000010001 | 1 |
| 224 | 0101000100010000 | 4 | 0101000100100000 | 4 | 0010000100100001 | 1 | 0010000100001001 | 1 |
| 225 | 0100000100000000 | 4 | 0100001010010000 | 4 | 0001000100100001 | 1 | 0101001000010001 | 1 |
| 226 | 0100000010000000 | 4 | 0100000101000100 | 4 | 0001001000100001 | 1 | 0101001000001001 | 1 |
| 227 | 0010000100100001 | 1 | 0000000010010001 | 1 | 0101001001010001 | 1 | 0100100100100001 | 1 |
| 228 | 0010000001001001 | 1 | 0000000001001001 | 1 | 0100010000010001 | 1 | 0100010001001001 | 1 |
| 229 | 0010000010001001 | 1 | 0000000000100001 | 1 | 0100001010000001 | 1 | 0100000100010001 | 1 |
| 230 | 0010000001000101 | 1 | 0000000010001001 | 1 | 0010000100001001 | 1 | 0100000010001001 | 1 |
| 231 | 0001000010010001 | 1 | 0000000100010001 | 1 | 0010000100100001 | 1 | 0010010010010001 | 1 |
| 232 | 0001000001001001 | 1 | 0000000100100001 | 1 | 0001000100010001 | 1 | 0010100100010001 | 1 |
| 233 | 0010000100100001 | 1 | 0010010010010001 | 1 | 0001000100100001 | 1 | 0010100100001001 | 1 |
| 234 | 0010000010000101 | 1 | 0010010000100101 | 1 | 0000100010010001 | 1 | 0000010000010001 | 1 |
| 235 | 0010100100010001 | 1 | 0001010010010001 | 1 | 0000100001001001 | 1 | 0000100000100001 | 1 |
| 236 | 0001000010001001 | 1 | 0001001001001001 | 1 | 0100100000001001 | 1 | 0000000010001001 | 1 |
| 237 | 0000100010010001 | 1 | 0000100100100001 | 1 | 0010010000001001 | 1 | 0000000100010001 | 1 |
| 238 | 0000100001001001 | 1 | 0000001000010001 | 1 | 0001001000001001 | 1 | 0000000010001001 | 1 |
| 239 | 0010010000000001 | 1 | 0000000100001001 | 1 | 0000001010001001 | 1 | 0000001010010001 | 1 |
| 240 | 0001001000000101 | 1 | 0010010010001001 | 1 | 0000100010001001 | 1 | 0000000100001001 | 1 |

FIG. 6E

| Data Symbol | DCG11 Code Word MSB LSB | NCG | DCG12 Code Word MSB LSB | NCG | DCG21 Code Word MSB LSB | NCG | DCG22 Code Word MSB LSB | NCG |
|---|---|---|---|---|---|---|---|---|
| 241 | 00001001000001001 | 1 | 00100100010001001 | 1 | 00000010010001001 | 1 | 01001000010010001 | 1 |
| 242 | 00000100100001001 | 1 | 00100010010010001 | 1 | 00000001001001001 | 1 | 01001000001001001 | 1 |
| 243 | 00010000100001001 | 1 | 00100010001001001 | 1 | 01001000000010001 | 1 | 00100100010010001 | 1 |
| 244 | 00001000100010001 | 1 | 00010010010001001 | 1 | 01000100000001001 | 1 | 00100100001001001 | 1 |
| 245 | 00001000010001001 | 1 | 00010001001001001 | 1 | 00100100000010001 | 1 | 00010010010010001 | 1 |
| 246 | 00000100010010001 | 1 | 00000100000010001 | 1 | 00100010000001001 | 1 | 00010010001001001 | 1 |
| 247 | 00000100001001001 | 1 | 00000010000001001 | 1 | 00010010000010001 | 1 | 00001001001001001 | 1 |
| 248 | 00010001000001001 | 1 | 00100000001001001 | 1 | 00010001000001001 | 1 | 00000001000010001 | 1 |
| 249 | 00001001000010001 | 1 | 00100000000010001 | 1 | 00001001000010001 | 1 | 00000001000001001 | 1 |
| 250 | 00001000100001001 | 1 | 00010000000001001 | 1 | 00001000100001001 | 1 | 01001000100010001 | 1 |
| 251 | 00000100100010001 | 1 | 00010000000010001 | 1 | 00000100100010001 | 1 | 01001000010001001 | 1 |
| 252 | 00000100010001001 | 1 | 00001000000001001 | 1 | 00000100010001001 | 1 | 01001000010010001 | 1 |
| 253 | 00000010010010001 | 1 | 00100100100001001 | 1 | 00000010010001001 | 1 | 01001000001001001 | 1 |
| 254 | 00000010001001001 | 1 | 00100010010001001 | 1 | 00000010001001001 | 1 | 00100100100010001 | 1 |
| 255 | 00100010000010001 | 1 | 00100001001001001 | 1 | 01000100000010001 | 1 | 00100100010001001 | 1 |

FIG. 6F

| Data Symbol | DCG31 Code Word MSB LSB | NCG | DCG32 Code Word MSB LSB | NCG | DCG41 Code Word MSB LSB | NCG | DCG42 Code Word MSB LSB | NCG |
|---|---|---|---|---|---|---|---|---|
| 000 | 10010010000000001 | 1 | 00100100000000001 | 1 | 10010010000000001 | 1 | 00100100000000001 | 1 |
| 001 | 10001001000000001 | 1 | 00010010000000001 | 1 | 10001001000000001 | 1 | 01000100000000001 | 1 |
| 002 | 10000100100000001 | 1 | 00001001000000001 | 1 | 10000100100000001 | 1 | 00100010000000001 | 1 |
| 003 | 10000010010000001 | 1 | 00000100100000001 | 1 | 10000010010000001 | 1 | 10000100000000001 | 1 |
| 004 | 10000001001000001 | 1 | 00000010010000001 | 1 | 10000001001000001 | 1 | 01000010000000001 | 1 |
| 005 | 10000000100100001 | 1 | 00100010000000001 | 1 | 10000000100100001 | 1 | 00100001000000001 | 1 |
| 006 | 10010001000000001 | 1 | 00010001000000001 | 1 | 10010001000000001 | 1 | 10010010010000001 | 1 |
| 007 | 10001000100000001 | 1 | 00001000100000001 | 1 | 10001000100000001 | 1 | 10010001001000001 | 1 |
| 008 | 10000100010000001 | 1 | 00000100010000001 | 1 | 10000100010000001 | 1 | 10010000100100001 | 1 |
| 009 | 10000010001000001 | 1 | 00000010001000001 | 1 | 10000010001000001 | 1 | 10000010000000001 | 1 |
| 010 | 10000001000100001 | 1 | 10000001000000001 | 1 | 10000001000100001 | 1 | 01001001001000001 | 1 |
| 011 | 10010000100000001 | 1 | 00100001000000001 | 1 | 01001001000000001 | 1 | 01001000100100001 | 1 |
| 012 | 10001000010000001 | 1 | 00010000100000001 | 1 | 01000100100000001 | 1 | 01000001000000001 | 1 |
| 013 | 10000100001000001 | 1 | 00001000010000001 | 1 | 01000010010000001 | 1 | 00100100100100001 | 1 |
| 014 | 10000010000100001 | 1 | 00000100001000001 | 1 | 01000001001000001 | 1 | 00100001000000001 | 1 |
| 015 | 00100100100000001 | 1 | 00000010000100001 | 1 | 01000000100100001 | 1 | 10010010001000001 | 1 |
| 016 | 00100010010000001 | 1 | 10010010010000001 | 1 | 10010000100000001 | 1 | 10010001000100001 | 1 |
| 017 | 00100001001000001 | 1 | 10010001001000001 | 1 | 10001000010000001 | 1 | 10001001001000001 | 1 |
| 018 | 00100000100100001 | 1 | 10010000100100001 | 1 | 10000100001000001 | 1 | 10001000100100001 | 1 |
| 019 | 00000100000000001 | 1 | 10000010000000001 | 1 | 10000010000100001 | 1 | 10000001000000001 | 1 |
| 020 | 10010000010000001 | 1 | 00100100100100001 | 1 | 01001000100000001 | 1 | 01001001000100001 | 1 |
| 021 | 10001000001000001 | 1 | 00100010001000001 | 1 | 01001000010000001 | 1 | 01001000100100001 | 1 |
| 022 | 10000100000100001 | 1 | 00010000010000001 | 1 | 01000010001000001 | 1 | 01000000100000001 | 1 |
| 023 | 00100100010000001 | 1 | 00001000001000001 | 1 | 01000001000100001 | 1 | 00100000010000001 | 1 |
| 024 | 00100010001000001 | 1 | 00000100000100001 | 1 | 00100100100000001 | 1 | 10000000000100001 | 1 |
| 025 | 00100001000100001 | 1 | 10010010001000001 | 1 | 00100100010000001 | 1 | 10000000001000001 | 1 |
| 026 | 00010010010000001 | 1 | 10010001000100001 | 1 | 00100000100000001 | 1 | 01000000000100001 | 1 |
| 027 | 00010001001000001 | 1 | 10001001001000001 | 1 | 00100000100100001 | 1 | 10000000010000001 | 1 |
| 028 | 00010000100100001 | 1 | 10010001000100001 | 1 | 10010000100100001 | 1 | 01000000010000001 | 1 |
| 029 | 00000010000000001 | 1 | 10000001000000001 | 1 | 10001000001000001 | 1 | 00100000000100001 | 1 |
| 030 | 10010000001000001 | 1 | 00100000010000001 | 1 | 10000100000100001 | 1 | 10010010000100001 | 1 |
| 031 | 10001000000100001 | 1 | 00010000001000001 | 1 | 10000001000010001 | 1 | 10010001000010001 | 1 |
| 032 | 00100100001000001 | 1 | 00001000000100001 | 1 | 01000100001000001 | 1 | 10000100100100001 | 1 |
| 033 | 00100010000100001 | 1 | 10000000000100001 | 1 | 10010000000100001 | 1 | 10000000100000001 | 1 |
| 034 | 00010010001000001 | 1 | 10000000001000001 | 1 | 01001000000100001 | 1 | 01000000010000001 | 1 |
| 035 | 00010001000100001 | 1 | 10000000010000001 | 1 | 00100100000100001 | 1 | 00100000001000001 | 1 |
| 036 | 00000100100100001 | 1 | 00100000001000001 | 1 | 10010010000000010 | 2 | 01001000000000010 | 2 |
| 037 | 00001000100100001 | 1 | 10010010000100001 | 1 | 10010001000000010 | 2 | 00100100000000010 | 2 |
| 038 | 10010000000100001 | 1 | 10010001000010001 | 1 | 10010000100000010 | 2 | 10010001000000010 | 2 |
| 039 | 00100100000100001 | 1 | 10000100100100001 | 1 | 10000010010000010 | 2 | 01000100000000010 | 2 |
| 040 | 00010010000100001 | 1 | 10000000100000001 | 1 | 10000001001000010 | 2 | 00100010000000010 | 2 |
| 041 | 00001001001000001 | 1 | 00100000001000001 | 1 | 10000000100100010 | 2 | 10000100000000010 | 2 |
| 042 | 00000100100100001 | 1 | 00010000000100001 | 1 | 10000000100100010 | 2 | 01000010000000010 | 2 |
| 043 | 10010010000000010 | 2 | 00100100000000010 | 2 | 10010001000000010 | 2 | 00100001000000010 | 2 |
| 044 | 10001001000000010 | 2 | 00010010000000010 | 2 | 10001000100000010 | 2 | 10010010010000010 | 2 |
| 045 | 10000100100000010 | 2 | 00001001000000010 | 2 | 10001000010000010 | 2 | 10010001001000010 | 2 |
| 046 | 10000010010000010 | 2 | 00000100100000010 | 2 | 10000100100100010 | 2 | 10010000100100010 | 2 |
| 047 | 10000001001000010 | 2 | 00000010010000010 | 2 | 10000001000100010 | 2 | 10010000100100010 | 2 |
| 048 | 10000000100100010 | 2 | 10001000000000010 | 2 | 10000000100010010 | 2 | 10000010000000010 | 2 |
| 049 | 10000000100010010 | 2 | 00100010000000010 | 2 | 01001001000000010 | 2 | 01001001001000010 | 2 |
| 050 | 10010001000000010 | 2 | 00010010000000010 | 2 | 01000100100000010 | 2 | 01001000100100010 | 2 |
| 051 | 10001000100000010 | 2 | 00001000100000010 | 2 | 01000010010000010 | 2 | 01001000100010010 | 2 |
| 052 | 10000100010000010 | 2 | 00000100010000010 | 2 | 01000001001000010 | 2 | 01001000010000010 | 2 |
| 053 | 10000010001000010 | 2 | 00000010001000010 | 2 | 01000000100100010 | 2 | 00100100100100010 | 2 |
| 054 | 10000001000100010 | 2 | 10000100000000010 | 2 | 01000000010010010 | 2 | 00100100100010010 | 2 |
| 055 | 10000000100010010 | 2 | 00100001000000010 | 2 | 10010000100000010 | 2 | 00100000100000010 | 2 |
| 056 | 00100100000000010 | 2 | 00010001000000010 | 2 | 00100100010000010 | 2 | 10000010001000010 | 2 |
| 057 | 10010000100000010 | 2 | 00001000100000010 | 2 | 10000100001000010 | 2 | 01000000000100010 | 2 |
| 058 | 10001000010000010 | 2 | 00000100001000010 | 2 | 10000010000100010 | 2 | 10000000001000010 | 2 |
| 059 | 10000100001000010 | 2 | 00000010001000010 | 2 | 10000100000010010 | 2 | 01000000000100010 | 2 |
| 060 | 10000010000100010 | 2 | 10010010010000010 | 2 | 01001000100000010 | 2 | 00100000001000010 | 2 |

FIG. 6G

| Data Symbol | DCG31 Code Word MSB LSB | NCG | DCG32 Code Word MSB LSB | NCG | DCG41 Code Word MSB LSB | NCG | DCG42 Code Word MSB LSB | NCG |
|---|---|---|---|---|---|---|---|---|
| 061 | 1000000100001 0010 | 2 | 1001000100100 0010 | 2 | 0100010001000 0010 | 2 | 1001001000001 0010 | 2 |
| 062 | 0010010010000 0010 | 2 | 1001000010010 0010 | 2 | 0100001000100 0010 | 2 | 1000100100001 0010 | 2 |
| 063 | 0010010010000 0010 | 2 | 1001000001001 0010 | 2 | 0100000100010 0010 | 2 | 1000010010001 0010 | 2 |
| 064 | 0010000100100 0010 | 2 | 1000010000010 0010 | 2 | 0100000010001 0010 | 2 | 1000001001001 0010 | 2 |
| 065 | 0010000010010 0010 | 2 | 0010010010010 0010 | 2 | 0010010010000 0010 | 2 | 1000000100100 0010 | 2 |
| 066 | 0010000001001 0010 | 2 | 0010010001001 0010 | 2 | 0010001001000 0010 | 2 | 0100000001000 0010 | 2 |
| 067 | 0000010000000 0010 | 2 | 0010000010000 0010 | 2 | 0010000100100 0010 | 2 | 0010000000010 0010 | 2 |
| 068 | 1001001001001 0010 | 2 | 0010001001001 0010 | 2 | 0010000010010 0010 | 2 | 1001001000010 0010 | 2 |
| 069 | 1001000010000 0010 | 2 | 0001000010000 0010 | 2 | 0010000001001 0010 | 2 | 1001000100001 0010 | 2 |
| 070 | 1000100001000 0010 | 2 | 0000100001000 0010 | 2 | 1001001001001 0010 | 2 | 1000100100100 0010 | 2 |
| 071 | 1000010000100 0010 | 2 | 0000010000100 0010 | 2 | 1001000010000 0010 | 2 | 1000010010010 0010 | 2 |
| 072 | 1000001000010 0010 | 2 | 0000001000010 0010 | 2 | 1001000010000 0010 | 2 | 1000001001001 0010 | 2 |
| 073 | 0010010010000 0010 | 2 | 1000000000100 0010 | 2 | 1000010001000 0010 | 2 | 1000010001001 0010 | 2 |
| 074 | 0010000100010 0010 | 2 | 1000000001000 0010 | 2 | 1000001000010 0010 | 2 | 1000000100000 0010 | 2 |
| 075 | 0010001000100 0010 | 2 | 0010000000010 0010 | 2 | 0100100010000 0010 | 2 | 0100100100001 0010 | 2 |
| 076 | 0010000100010 0010 | 2 | 1001001000001 0010 | 2 | 0100010001000 0010 | 2 | 0100010010010 0010 | 2 |
| 077 | 0001001001000 0010 | 2 | 1000100100001 0010 | 2 | 1001000010001 0010 | 2 | 0100001001010 0010 | 2 |
| 078 | 0001000001001 0010 | 2 | 1000010010010 0010 | 2 | 0100100000010 0010 | 2 | 0100000010001 0010 | 2 |
| 079 | 0000010010010 0010 | 2 | 1000001001010 0010 | 2 | 0010010000010 0010 | 2 | 0010000010001 0010 | 2 |
| 080 | 0000100100100 0010 | 2 | 1000000010010 0010 | 2 | 1001000000010 0010 | 2 | 1001001000010 0010 | 2 |
| 081 | 0000100010010 0010 | 2 | 0010000000100 0010 | 2 | 1000100000010 0010 | 2 | 1001001000100 0010 | 2 |
| 082 | 1001000000010 0010 | 2 | 0001000000010 0010 | 2 | 0100100000100 0010 | 2 | 1001000100010 0010 | 2 |
| 083 | 0010010000010 0010 | 2 | 1001000100100 0010 | 2 | 0100001000010 0010 | 2 | 1000100100100 0010 | 2 |
| 084 | 0001001000010 0010 | 2 | 1001000100100 0010 | 2 | 0010010000100 0010 | 2 | 1000100100100 0010 | 2 |
| 085 | 0000100100010 0010 | 2 | 1000100100100 0010 | 2 | 0010000100010 0010 | 2 | 1000100010010 0010 | 2 |
| 086 | 0000010010010 0010 | 2 | 1000100010010 0010 | 2 | 1001000010000 0010 | 2 | 1000000100000 0010 | 2 |
| 087 | 0000010010010 0010 | 2 | 1000010010010 0010 | 2 | 1001000010000 0010 | 2 | 0100001001001 0010 | 2 |
| 088 | 1001000000100 0010 | 2 | 1000001001010 0010 | 2 | 1000001000010 0010 | 2 | 0100010010010 0010 | 2 |
| 089 | 1001000000010 0010 | 2 | 1000000100010 0010 | 2 | 0100100001000 0010 | 2 | 0100010010010 0010 | 2 |
| 090 | 0010010000100 0010 | 2 | 0010000001000 0010 | 2 | 0100010000100 0010 | 2 | 0100010001001 0010 | 2 |
| 091 | 0010001000000 0010 | 2 | 0010000000100 0010 | 2 | 0100001000100 0010 | 2 | 0100000100000 0010 | 2 |
| 092 | 0001001000010 0010 | 2 | 0000100000010 0010 | 2 | 0010010001000 0010 | 2 | 0010010010010 0010 | 2 |
| 093 | 0001001000010 0010 | 2 | 1001001001000 0010 | 2 | 0010001000100 0010 | 2 | 0010010010010 0010 | 2 |
| 094 | 0000100100100 0010 | 2 | 1001000100010 0010 | 2 | 0010000100010 0010 | 2 | 0010000010000 0010 | 2 |
| 095 | 0000100010010 0010 | 2 | 1001001000100 0010 | 2 | 1001001000000 0100 | 3 | 1001001000000 0100 | 3 |
| 096 | 0000010010010 0010 | 2 | 1000100100100 0010 | 2 | 1000100100000 0100 | 3 | 0100100000000 0100 | 3 |
| 097 | 0000010010010 0010 | 2 | 1000100100100 0010 | 2 | 1000001001000 0100 | 3 | 0010010000000 0100 | 3 |
| 098 | 1001000001000 0010 | 2 | 1000100010010 0010 | 2 | 1000000100100 0100 | 3 | 1001000000001 000 | 3 |
| 099 | 1001000000100 0010 | 2 | 1000010010010 0010 | 2 | 1000000010100 0100 | 3 | 1001000010001 0010 | 3 |
| 100 | 1000010000010 0010 | 2 | 0010010010010 0010 | 2 | 1000000010100 0100 | 3 | 0100100000000 1000 | 3 |
| 101 | 0010010000100 0010 | 2 | 0010001001010 0010 | 2 | 0100000000100 0100 | 3 | 0100010000000 0100 | 3 |
| 102 | 0010001000100 0010 | 2 | 0010000000100 0010 | 2 | 0010000000001 000 | 3 | 0010010000000 0100 | 3 |
| 103 | 0010000100010 0010 | 2 | 0001000001000 0010 | 2 | 1001001000000 0100 | 3 | 0010010000000 0100 | 3 |
| 104 | 0001001000100 0010 | 2 | 0000010000100 0010 | 2 | 1001000000000 0100 | 3 | 1001000000001 0000 | 3 |
| 105 | 0001000100010 0010 | 2 | 0000010000010 0010 | 2 | 1001000100000 0100 | 3 | 1001000000001 000 | 3 |
| 106 | 1001001000000 0100 | 3 | 1001000000000 0100 | 3 | 1001000100000 0100 | 3 | 1000010000000 0100 | 3 |
| 107 | 1000100100000 0100 | 3 | 1001000100000 0100 | 3 | 1000010010000 0100 | 3 | 0100100000000 0100 | 3 |
| 108 | 1000001001000 0100 | 3 | 0001001000000 0100 | 3 | 1000010000010 0100 | 3 | 0100100000001 0000 | 3 |
| 109 | 1000000100100 0100 | 3 | 0000010001000 0100 | 3 | 1000000100010 0100 | 3 | 0100001000000 0100 | 3 |
| 110 | 1000000100010 0100 | 3 | 0000010000100 0100 | 3 | 1000001001000 0100 | 3 | 0010010000000 1000 | 3 |
| 111 | 1000000100100 0100 | 3 | 0000010001001 0000 | 3 | 1000000100100 0100 | 3 | 0010010000000 1000 | 3 |
| 112 | 0010000000001 0000 | 3 | 1001000000001 0000 | 3 | 1000000100010 0100 | 3 | 0010001000000 0100 | 3 |
| 113 | 0001000000001 0000 | 3 | 1001000000000 0100 | 3 | 0100010010000 0100 | 3 | 1000000001001 0000 | 3 |
| 114 | 1001001000000 0100 | 3 | 0010010000000 1000 | 3 | 0100010001000 0100 | 3 | 1000000001001 000 | 3 |
| 115 | 0010010000000 1000 | 3 | 0010001000000 1000 | 3 | 0100000010001 000 | 3 | 1000000000100 0100 | 3 |
| 116 | 1000010010000 0001 | 3 | 0001001000000 1000 | 3 | 0100000100010 0100 | 3 | 1000000010000 0100 | 3 |
| 117 | 1000100010000 0100 | 3 | 0001000100000 1000 | 3 | 0100000100100 0100 | 3 | 1000000010001 000 | 3 |
| 118 | 1000010010000 0100 | 3 | 0000100100000 1000 | 3 | 0010000000001 000 | 3 | 1000000000100 100 | 3 |
| 119 | 1000001001000 0100 | 3 | 0000100100000 1000 | 3 | 1001001000000 1000 | 3 | 0100000001001 000 | 3 |
| 120 | 1000000100010 1000 | 3 | 0000001001000 1000 | 3 | 1001001000000 1000 | 3 | 0100000000101 000 | 3 |

FIG. 6H

| Data Symbol | DCG31 Code Word MSB LSB | NCG | DCG32 Code Word MSB LSB | NCG | DCG41 Code Word MSB LSB | NCG | DCG42 Code Word MSB LSB | NCG |
|---|---|---|---|---|---|---|---|---|
| 121 | 10000010001000100 | 3 | 00000100010000100 | 3 | 10010000100000100 | 3 | 01000000000100100 | 3 |
| 122 | 10000001001001000 | 3 | 00000100010001000 | 3 | 10001001000010000 | 3 | 10000001000010000 | 3 |
| 123 | 10000001000100100 | 3 | 00000010001000100 | 3 | 10001000100001000 | 3 | 10000000100001000 | 3 |
| 124 | 00100000000010000 | 3 | 10010000000010000 | 3 | 10001000010000100 | 3 | 10000000010000100 | 3 |
| 125 | 00010000000001000 | 3 | 10001000000010000 | 3 | 10000100100010000 | 3 | 01000000100010000 | 3 |
| 126 | 00001000000000100 | 3 | 10000100000000100 | 3 | 10000100010001000 | 3 | 01000000100001000 | 3 |
| 127 | 10010010000010000 | 3 | 00100100000010000 | 3 | 10000100001000100 | 3 | 01000000001000100 | 3 |
| 128 | 10010001000001000 | 3 | 00100010000001000 | 3 | 10000100010010000 | 3 | 00100000100010000 | 3 |
| 129 | 10010000100000100 | 3 | 00100001000010000 | 3 | 10000010001001000 | 3 | 00100000010001000 | 3 |
| 130 | 10001001000010000 | 3 | 00010010000010000 | 3 | 10000010000100100 | 3 | 00100000000100100 | 3 |
| 131 | 10001000100001000 | 3 | 00010001000001000 | 3 | 01001001000001000 | 3 | 10010010010010000 | 3 |
| 132 | 10001000010000100 | 3 | 00010000100000100 | 3 | 01001000100000100 | 3 | 10010010001001000 | 3 |
| 133 | 10000100100010000 | 3 | 00001001000010000 | 3 | 01001000010000100 | 3 | 10010010000100100 | 3 |
| 134 | 10000100010001000 | 3 | 00001000100001000 | 3 | 01000100010010000 | 3 | 10001001001001000 | 3 |
| 135 | 10000100001000100 | 3 | 00001000010000100 | 3 | 01000010001001000 | 3 | 10001001000100100 | 3 |
| 136 | 10000100100100000 | 3 | 00000100100100000 | 3 | 01000100001000100 | 3 | 10000100100100100 | 3 |
| 137 | 10000010001001000 | 3 | 00000100010001000 | 3 | 00100100100001000 | 3 | 10000100000100000 | 3 |
| 138 | 10000010000100100 | 3 | 00000100001000100 | 3 | 00100100010000100 | 3 | 10000010000001000 | 3 |
| 139 | 00100100100000100 | 3 | 00000010010010000 | 3 | 00100010010001000 | 3 | 10000000100000100 | 3 |
| 140 | 00100010010000100 | 3 | 00000010001001000 | 3 | 00100010001000100 | 3 | 01000001000010000 | 3 |
| 141 | 00100001001000100 | 3 | 00000010000100100 | 3 | 00100001001001000 | 3 | 01000000100001000 | 3 |
| 142 | 00100000100100100 | 3 | 10000000100010000 | 3 | 00100001000100100 | 3 | 01000000010000100 | 3 |
| 143 | 00010000000010000 | 3 | 10000000001001000 | 3 | 10010000100010000 | 3 | 00100000100010000 | 3 |
| 144 | 00001000000001000 | 3 | 10000000000100100 | 3 | 10010000010001000 | 3 | 00100000010001000 | 3 |
| 145 | 00000100000000100 | 3 | 10000001000010000 | 3 | 10010000001000100 | 3 | 00100000001000100 | 3 |
| 146 | 10010000100010000 | 3 | 10000000010001000 | 3 | 01001000100010000 | 3 | 10010010010001000 | 3 |
| 147 | 10010000001001000 | 3 | 10000000001000100 | 3 | 01001000001001000 | 3 | 10010010001000100 | 3 |
| 148 | 10010000000100100 | 3 | 10000001000100100 | 3 | 01001000000100100 | 3 | 10010010001001000 | 3 |
| 149 | 00100100100010000 | 3 | 10000000100001000 | 3 | 00100100010010000 | 3 | 10010001000100100 | 3 |
| 150 | 00100100001001000 | 3 | 10000000010000100 | 3 | 00100100001001000 | 3 | 10001001001000100 | 3 |
| 151 | 00100100000100100 | 3 | 00100000100010000 | 3 | 00100100010010000 | 3 | 10001001000100100 | 3 |
| 152 | 00010010010010000 | 3 | 00100000001001000 | 3 | 10010000100010000 | 3 | 10000100000010000 | 3 |
| 153 | 00010010001001000 | 3 | 00100000000100100 | 3 | 10010000010001000 | 3 | 10000010000001000 | 3 |
| 154 | 00010010000100100 | 3 | 10010010010010000 | 3 | 10010000001000100 | 3 | 10000001000000100 | 3 |
| 155 | 00001001001001000 | 3 | 10010010001001000 | 3 | 10001001001001000 | 3 | 01001001001001000 | 3 |
| 156 | 00001001000100100 | 3 | 10010010000100100 | 3 | 10001000000100100 | 3 | 01001001000100100 | 3 |
| 157 | 00000100100100100 | 3 | 10010010001001000 | 3 | 10001000000100100 | 3 | 01000100100100100 | 3 |
| 158 | 00000010100000100 | 3 | 10010010000100100 | 3 | 01000100000100100 | 3 | 01000100000100000 | 3 |
| 159 | 10010001100010000 | 3 | 10000100100100100 | 3 | 01001000100001000 | 3 | 01000000100000100 | 3 |
| 160 | 10010000100001000 | 3 | 10000100000010000 | 3 | 01001000001000100 | 3 | 01000000100000100 | 3 |
| 161 | 10010000001000100 | 3 | 10000001000001000 | 3 | 01000100010010000 | 3 | 00100001000010000 | 3 |
| 162 | 10001000100010000 | 3 | 10000000100010000 | 3 | 01000100001001000 | 3 | 00100000100001000 | 3 |
| 163 | 10001000001001000 | 3 | 00100000100010000 | 3 | 01000100000100100 | 3 | 00100000010000100 | 3 |
| 164 | 10001000000100100 | 3 | 00100000010001000 | 3 | 00100100100010000 | 3 | 10010010010000100 | 3 |
| 165 | 00100100100010000 | 3 | 00100000001000100 | 3 | 00100100010001000 | 3 | 10010001001000100 | 3 |
| 166 | 00100100010001000 | 3 | 00100001000010000 | 3 | 00100100010010000 | 3 | 10010000100100100 | 3 |
| 167 | 00100100001000100 | 3 | 00010000001001000 | 3 | 00100010010010000 | 3 | 10001000000010000 | 3 |
| 168 | 00100100010010000 | 3 | 00010000000100100 | 3 | 00100100001001000 | 3 | 10000100000001000 | 3 |
| 169 | 00100100001001000 | 3 | 10010010010001000 | 3 | 00100010000100100 | 3 | 10000010000000100 | 3 |
| 170 | 00100100010000100 | 3 | 10010010001000100 | 3 | 10010010001000100 | 3 | 01001001001000100 | 3 |
| 171 | 00010010010001000 | 3 | 10010001001001000 | 3 | 10010000100001000 | 3 | 01001000100100100 | 3 |
| 172 | 00010010001000100 | 3 | 10010001000100100 | 3 | 10010000010000100 | 3 | 01000100000010000 | 3 |
| 173 | 00010010010010000 | 3 | 10001001001000100 | 3 | 10001000100010000 | 3 | 01000010000001000 | 3 |
| 174 | 00010010001000100 | 3 | 10001000100100100 | 3 | 10001000010000100 | 3 | 01000010000100000 | 3 |
| 175 | 00001001001000100 | 3 | 10000100000010000 | 3 | 10001000001000100 | 3 | 00100100100100100 | 3 |
| 176 | 00001000100100100 | 3 | 10000010000001000 | 3 | 10000100010010000 | 3 | 00100010000010000 | 3 |
| 177 | 00000100000010000 | 3 | 10000001000000100 | 3 | 10000100001001000 | 3 | 00100001000001000 | 3 |
| 178 | 00000010000001000 | 3 | 00100010000010000 | 3 | 10000100000010000 | 3 | 00100000100000100 | 3 |
| 179 | 10010001000010000 | 3 | 00100000100001000 | 3 | 10000000000100000 | 4 | 10000100000000000 | 4 |
| 180 | 10010000100001000 | 3 | 00100000010000100 | 3 | 10000000001000000 | 4 | 10000100010000000 | 4 |

FIG. 6I

| Data Symbol | DCG31 Code Word MSB　　LSB | NCG | DCG32 Code Word MSB　　LSB | NCG | DCG41 Code Word MSB　　LSB | NCG | DCG42 Code Word MSB　　LSB | NCG |
|---|---|---|---|---|---|---|---|---|
| 181 | 1001000010000100 | 3 | 0001000010010000 | 3 | 0100000000100000 | 4 | 1000000100100000 | 4 |
| 182 | 1000100010001000 | 3 | 0001000001001000 | 3 | 1000000010000000 | 4 | 1000000100100000 | 4 |
| 183 | 1000100010001000 | 3 | 0001000001000100 | 3 | 0100000001000000 | 4 | 1000100000100000 | 4 |
| 184 | 1000100001000100 | 3 | 0000100010010000 | 3 | 0010000000100000 | 4 | 1000010010000000 | 4 |
| 185 | 1000010010010000 | 3 | 0000100001001000 | 3 | 1001001001000000 | 4 | 1000001000100000 | 4 |
| 186 | 1000010001001000 | 3 | 0000100000100100 | 3 | 1001001001000000 | 4 | 1000000100100000 | 4 |
| 187 | 1000010000100100 | 3 | 1001001001000100 | 3 | 1001000010100000 | 4 | 0100010010000000 | 4 |
| 188 | 0010010010001000 | 3 | 1001001001000100 | 3 | 0100100100100000 | 4 | 0100001001000000 | 4 |
| 189 | 0010010001010000 | 3 | 1001000010010100 | 3 | 0100100010100000 | 4 | 0100000100100000 | 4 |
| 190 | 0010010010001000 | 3 | 1000100000010000 | 3 | 0010010001010000 | 4 | 0100000010100000 | 4 |
| 191 | 0010010001000100 | 3 | 1000010000001000 | 3 | 0010000000100000 | 4 | 1001000010000000 | 4 |
| 192 | 0010001001001000 | 3 | 1000001000000100 | 3 | 1001001001000000 | 4 | 1000100010000000 | 4 |
| 193 | 0010000100101000 | 3 | 0010010010010100 | 3 | 1001001001000000 | 4 | 1000010001000000 | 4 |
| 194 | 0001010010000100 | 3 | 0010010000010000 | 3 | 1001001001010000 | 4 | 1000001010000000 | 4 |
| 195 | 0001000100100100 | 3 | 0010001001001000 | 3 | 1001000010100000 | 4 | 0100100100000000 | 4 |
| 196 | 0001000010100100 | 3 | 0010000010000100 | 3 | 0100100010100000 | 4 | 0100010010000000 | 4 |
| 197 | 0000100000001000 | 3 | 0001000100001000 | 3 | 0100010010100000 | 4 | 0100000100100000 | 4 |
| 198 | 0000010000001000 | 3 | 0001000010001000 | 3 | 0100000100000000 | 4 | 0100000100100000 | 4 |
| 199 | 0000010000000100 | 3 | 0001000001000100 | 3 | 0010000010000000 | 4 | 0010000100000000 | 4 |
| 200 | 1000000000100000 | 4 | 1000001001000000 | 4 | 1001000010000000 | 4 | 0010001001000000 | 4 |
| 201 | 1000000001010000 | 4 | 1000001000100000 | 4 | 1000100100000000 | 4 | 0010001000100000 | 4 |
| 202 | 1000000010000000 | 4 | 1000000010010000 | 4 | 1000001001000000 | 4 | 0010001000100000 | 4 |
| 203 | 0010000000100000 | 4 | 1000001010000000 | 4 | 1000000100000000 | 4 | 1001000010000000 | 4 |
| 204 | 0000001001000000 | 4 | 1000001000100000 | 4 | 0100000001000000 | 4 | 1000100000100000 | 4 |
| 205 | 0000001000100000 | 4 | 1000000010100000 | 4 | 0010000001000000 | 4 | 1000001000100000 | 4 |
| 206 | 0000001000100000 | 4 | 1000100001000000 | 4 | 1000000010010001 | 1 | 1001000010010001 | 1 |
| 207 | 0001000010000000 | 4 | 1000010000100000 | 4 | 1000000001001001 | 1 | 1001000001001001 | 1 |
| 208 | 0000010001000000 | 4 | 1000001000100000 | 4 | 1000000100010001 | 1 | 0100100010010001 | 1 |
| 209 | 0000001000100000 | 4 | 0010000100100000 | 4 | 1000000010001001 | 1 | 0100100001001001 | 1 |
| 210 | 1001001001000000 | 4 | 0010000101000000 | 4 | 0100000010010001 | 1 | 0010010001010001 | 1 |
| 211 | 1001001000100000 | 4 | 0010000100010000 | 4 | 0100000001001001 | 1 | 0010010000001001 | 1 |
| 212 | 1001000010100000 | 4 | 1001000001000000 | 4 | 1000000100010001 | 1 | 1001000010010001 | 1 |
| 213 | 0010010010000000 | 4 | 1000100001000000 | 4 | 1000000100100001 | 1 | 1001000010001001 | 1 |
| 214 | 0001000010100000 | 4 | 1000001000010000 | 4 | 0100000100010001 | 1 | 1001000001010001 | 1 |
| 215 | 0001000100100000 | 4 | 0010010010000000 | 4 | 0100000010001001 | 1 | 1000010010001001 | 1 |
| 216 | 0000010000101000 | 4 | 0010000100100000 | 4 | 0010000010010001 | 1 | 0100100100010001 | 1 |
| 217 | 1001010000100000 | 4 | 0010001000010000 | 4 | 0010000001010001 | 1 | 0100100001001001 | 1 |
| 218 | 1001001000100000 | 4 | 0001000100100000 | 4 | 1001001001010001 | 1 | 0100100001001001 | 1 |
| 219 | 1001001001000000 | 4 | 0001000100010000 | 4 | 1001001000010001 | 1 | 0100100010001001 | 1 |
| 220 | 1001001001000000 | 4 | 0001000010100000 | 4 | 1000010010010001 | 1 | 0010010010010001 | 1 |
| 221 | 0010000100100000 | 4 | 1010100001000000 | 4 | 1000001000010001 | 1 | 0010001001001001 | 1 |
| 222 | 0001000100000000 | 4 | 1001000000100000 | 4 | 1000000100010001 | 1 | 0010001001001001 | 1 |
| 223 | 0001000010001000 | 4 | 0010010000100000 | 4 | 0100000100010001 | 1 | 0010001000001001 | 1 |
| 224 | 1001010000100000 | 4 | 0010010000100000 | 4 | 0100000010010001 | 1 | 1001000000010001 | 1 |
| 225 | 1000100010001000 | 4 | 0001010010001000 | 4 | 0010000010010001 | 1 | 0010001000001001 | 1 |
| 226 | 1000010010010000 | 4 | 0001000100100000 | 4 | 0010000001001001 | 1 | 1001001000001001 | 1 |
| 227 | 0010000000001000 | 4 | 0000100100100000 | 4 | 1001001001001001 | 1 | 1000100100001001 | 1 |
| 228 | 0001000000100000 | 4 | 0000100010100000 | 4 | 1001000100001001 | 1 | 1000010010001001 | 1 |
| 229 | 1001000000010001 | 1 | 1001000001010001 | 1 | 1000010000010001 | 1 | 1000000100010001 | 1 |
| 230 | 1000000001001001 | 1 | 1001000001001001 | 1 | 1000001000001001 | 1 | 1000000100001001 | 1 |
| 231 | 1000000100010001 | 1 | 0010010001010001 | 1 | 0100100100001001 | 1 | 0010000100001001 | 1 |
| 232 | 1000000001001001 | 1 | 0010001000001001 | 1 | 0100001000010001 | 1 | 1001000010001001 | 1 |
| 233 | 1000000001001001 | 1 | 0001010001010001 | 1 | 0100000100001001 | 1 | 1001000100001001 | 1 |
| 234 | 1000000001001001 | 1 | 0001010001001001 | 1 | 0010000010010001 | 1 | 1000100100001001 | 1 |
| 235 | 0010000010001001 | 1 | 0000101001001001 | 1 | 0010000010001001 | 1 | 1000100100001001 | 1 |
| 236 | 0010000001010001 | 1 | 0000010010001001 | 1 | 1001000000001001 | 1 | 1000010010001001 | 1 |
| 237 | 1001010010010001 | 1 | 1001000100010001 | 1 | 0100100100001001 | 1 | 1000010010001001 | 1 |
| 238 | 1001001001001001 | 1 | 1001000010001001 | 1 | 0010010000001001 | 1 | 1000001001010001 | 1 |
| 239 | 1001000100010001 | 1 | 1000100010010001 | 1 | 1001000000010001 | 1 | 1000001000100001 | 1 |
| 240 | 1000010000010001 | 1 | 1000100001001001 | 1 | 1000100000001001 | 1 | 0100100100001001 | 1 |

FIG. 6J

| Data Symbol | DCG31 Code Word MSB LSB | NCG | DCG32 Code Word MSB LSB | NCG | DCG41 Code Word MSB LSB | NCG | DCG42 Code Word MSB LSB | NCG |
|---|---|---|---|---|---|---|---|---|
| 241 | 10000001000001001 | 1 | 00100100100010001 | 1 | 01001000000010001 | 1 | 01000100100001001 | 1 |
| 242 | 00100000100010001 | 1 | 00100100010001001 | 1 | 01000100000001001 | 1 | 01000010010001001 | 1 |
| 243 | 00100000010001001 | 1 | 00100010010010001 | 1 | 00100100000010001 | 1 | 01000001001001001 | 1 |
| 244 | 00010000010010001 | 1 | 00100010001001001 | 1 | 00100010000001001 | 1 | 10010001000010001 | 1 |
| 245 | 00010000001001001 | 1 | 00010010010001001 | 1 | 10001000000010001 | 1 | 10010000100001001 | 1 |
| 246 | 10010010010001001 | 1 | 00010001001001001 | 1 | 10000100000001001 | 1 | 10001000100010001 | 1 |
| 247 | 10010001001001001 | 1 | 00000100000011001 | 1 | 01000100000010001 | 1 | 10001000010001001 | 1 |
| 248 | 10000100000010001 | 1 | 00000010000001001 | 1 | 01000010000001001 | 1 | 10000100010010001 | 1 |
| 249 | 10000010000001001 | 1 | 00100000000001001 | 1 | 00100010000010001 | 1 | 10000100001001001 | 1 |
| 250 | 00100001000010001 | 1 | 10010010000001001 | 1 | 00100001000001001 | 1 | 01001001000010001 | 1 |
| 251 | 00100010100001001 | 1 | 10001001000001001 | 1 | 01000100100001000 | 3 | 01001001000010000 | 3 |
| 252 | 00010000100010001 | 1 | 10000100100010001 | 1 | 01000100010000100 | 3 | 01001000100001000 | 3 |
| 253 | 00010000010001001 | 1 | 10000010010001001 | 1 | 01000010010001000 | 3 | 01001000010000100 | 3 |
| 254 | 00001000010010001 | 1 | 10000001001001001 | 1 | 01000010001000100 | 3 | 01000100100010000 | 3 |
| 255 | 00001000010001001 | 1 | 00100000000010001 | 1 | 01000001001001000 | 3 | 01000100010001000 | 3 |

FIG. 7A

| Data Symbol | ACG1 Code Word MSB            LSB | NCG | ACG2 Code Word MSB            LSB | NCG | ACG3 Code Word MSB            LSB | NCG | ACG4 Code Word MSB            LSB | NCG |
|---|---|---|---|---|---|---|---|---|
| 000 | 000001000000000 | 4 | 000001000000000 | 4 | 100100010000001 | 1 | 000001000000001 | 1 |
| 001 | 000010000000000 | 4 | 000010000000000 | 4 | 100100100000001 | 1 | 000010000000001 | 1 |
| 002 | 001001000000000 | 4 | 001001000000000 | 4 | 100100100100001 | 1 | 000100000000001 | 1 |
| 003 | 010001000000000 | 4 | 010001000000000 | 4 | 000000001000001 | 1 | 000001000100001 | 1 |
| 004 | 010010000000000 | 4 | 010010000000000 | 4 | 000000010000001 | 1 | 000001001000001 | 1 |
| 005 | 010010010001001 | 1 | 010010010010010 | 2 | 100100010000010 | 2 | 000010000100001 | 1 |
| 006 | 010010010010000 | 3 |   |   | 100100100000010 | 2 | 000010001000001 | 1 |
| 007 | 010010010010001 | 1 |   |   | 000000010010010 | 2 | 000010010000001 | 1 |
| 008 | 010010010010010 | 2 |   |   | 100100010010010 | 2 | 000100000100001 | 1 |
| 009 |   |   |   |   | 100100100010010 | 2 | 000100001000001 | 1 |
| 010 |   |   |   |   | 100100100100010 | 2 | 000100010000001 | 1 |
| 011 |   |   |   |   | 000000001000010 | 2 | 000100100000001 | 1 |
| 012 |   |   |   |   | 000000010000010 | 2 | 100100100100001 | 1 |
| 013 |   |   |   |   | 100100010000100 | 3 | 000100100100001 | 1 |
| 014 |   |   |   |   | 100100100000100 | 3 | 000010000000010 | 2 |
| 015 |   |   |   |   | 100100100001000 | 3 | 000100000000010 | 2 |
| 016 |   |   |   |   | 100100100100100 | 3 | 000001000010010 | 2 |
| 017 |   |   |   |   | 000000001000100 | 3 | 000001000100010 | 2 |
| 018 |   |   |   |   | 000000001001000 | 3 | 000001001000010 | 2 |
| 019 |   |   |   |   | 000000010000100 | 3 | 000010000010010 | 2 |
| 020 |   |   |   |   | 000000010001000 | 3 | 000010000100010 | 2 |
| 021 |   |   |   |   | 000000010010000 | 3 | 000010001000010 | 2 |
| 022 |   |   |   |   | 100100010001000 | 3 | 000010010000010 | 2 |
| 023 |   |   |   |   | 100100010010000 | 3 | 000100000100010 | 2 |
| 024 |   |   |   |   | 100100100010000 | 3 | 000100001000010 | 2 |
| 025 |   |   |   |   | 000000001000000 | 4 | 000100010000010 | 2 |
| 026 |   |   |   |   | 000000010000000 | 4 | 000100100000010 | 2 |
| 027 |   |   |   |   | 000001000000000 | 4 | 100100100100010 | 2 |
| 028 |   |   |   |   | 000010000000000 | 4 | 000100000010010 | 2 |
| 029 |   |   |   |   | 100100100000000 | 4 | 100100100010010 | 2 |
| 030 |   |   |   |   | 001001000000000 | 4 | 000001000000010 | 2 |
| 031 |   |   |   |   | 100001000000000 | 4 | 000010010010010 | 2 |
| 032 |   |   |   |   | 100010000000000 | 4 | 000100010010010 | 2 |
| 033 |   |   |   |   | 100100100100000 | 4 | 000100100010010 | 2 |
| 034 |   |   |   |   | 100100010001001 | 1 | 000100100100010 | 2 |
| 035 |   |   |   |   | 100100100001001 | 1 | 000100000000100 | 3 |
| 036 |   |   |   |   | 100100100010001 | 1 | 000001000100100 | 3 |
| 037 |   |   |   |   | 000000001001001 | 1 | 000001001000100 | 3 |
| 038 |   |   |   |   | 000000010001001 | 1 | 000001001001000 | 3 |
| 039 |   |   |   |   | 000000010010001 | 1 | 000010000100100 | 3 |
| 040 |   |   |   |   | 100100010010001 | 1 | 000010001000100 | 3 |
| 041 |   |   |   |   |   |   | 000010001001000 | 3 |
| 042 |   |   |   |   |   |   | 000010010000100 | 3 |
| 043 |   |   |   |   |   |   | 000010010001000 | 3 |
| 044 |   |   |   |   |   |   | 000010010010000 | 3 |
| 045 |   |   |   |   |   |   | 000100001000100 | 3 |
| 046 |   |   |   |   |   |   | 000100010000100 | 3 |
| 047 |   |   |   |   |   |   | 000100010001000 | 3 |
| 048 |   |   |   |   |   |   | 000100100000100 | 3 |
| 049 |   |   |   |   |   |   | 000100100001000 | 3 |
| 050 |   |   |   |   |   |   | 000100100010000 | 3 |
| 051 |   |   |   |   |   |   | 000100000100100 | 3 |
| 052 |   |   |   |   |   |   | 000100001001000 | 3 |
| 053 |   |   |   |   |   |   | 000100010010000 | 3 |
| 054 |   |   |   |   |   |   | 100100100100100 | 3 |
| 055 |   |   |   |   |   |   | 000001000000100 | 3 |
| 056 |   |   |   |   |   |   | 000001000001000 | 3 |
| 057 |   |   |   |   |   |   | 000001000010000 | 3 |
| 058 |   |   |   |   |   |   | 000010000000100 | 3 |
| 059 |   |   |   |   |   |   | 000010000001000 | 3 |
| 060 |   |   |   |   |   |   | 000010000010000 | 3 |

FIG. 7B

| Data Symbol | ACG1 Code Word MSB LSB | NCG | ACG2 Code Word MSB LSB | NCG | ACG3 Code Word MSB LSB | NCG | ACG4 Code Word MSB LSB | NCG |
|---|---|---|---|---|---|---|---|---|
| 061 | | | | | | | 000100000001000 | 3 |
| 062 | | | | | | | 000100000010000 | 3 |
| 063 | | | | | | | 000100100100100 | 3 |
| 064 | | | | | | | 000100100100000 | 4 |
| 065 | | | | | | | 000001000000000 | 4 |
| 066 | | | | | | | 000010000000000 | 4 |
| 067 | | | | | | | 000001000100000 | 4 |
| 068 | | | | | | | 000001001000000 | 4 |
| 069 | | | | | | | 000010000100000 | 4 |
| 070 | | | | | | | 000010001000000 | 4 |
| 071 | | | | | | | 000010010000000 | 4 |
| 072 | | | | | | | 000100000100000 | 4 |
| 073 | | | | | | | 000100001000000 | 4 |
| 074 | | | | | | | 000100010000000 | 4 |
| 075 | | | | | | | 000100100000000 | 4 |
| 076 | | | | | | | 001001000000000 | 4 |
| 077 | | | | | | | 010001000000000 | 4 |
| 078 | | | | | | | 010010000000000 | 4 |
| 079 | | | | | | | 100001000000000 | 4 |
| 080 | | | | | | | 100010000000000 | 4 |
| 081 | | | | | | | 100100100100000 | 4 |
| 082 | | | | | | | 000100000001001 | 1 |
| 083 | | | | | | | 000001001001001 | 1 |
| 084 | | | | | | | 000010001001001 | 1 |
| 085 | | | | | | | 000100010001001 | 1 |
| 086 | | | | | | | 000010010010001 | 1 |
| 087 | | | | | | | 000100001001001 | 1 |
| 088 | | | | | | | 000100010001001 | 1 |
| 089 | | | | | | | 000100010010001 | 1 |
| 090 | | | | | | | 000100100001001 | 1 |
| 091 | | | | | | | 000100100010001 | 1 |
| 092 | | | | | | | 000001000001001 | 1 |
| 093 | | | | | | | 000001000010001 | 1 |
| 094 | | | | | | | 000010000001001 | 1 |
| 095 | | | | | | | 000010000010001 | 1 |
| 096 | | | | | | | 000100000010001 | 1 |
| 097 | | | | | | | 100100100010001 | 1 |

CODE WORD a      CODE WORD b

| | M | 1 | 2 | 3 | 4 |
|---|---|---|---|---|---|
| $MCG_M$ : MAIN CONVERSION TABLE | | MCG1 | MCG2 | MCG3 | MCG4 |
| $DCG_M$ : DC CONTROL CONVERSION TABLE | | DCG11/ DCG12 | DCG21/ DCG22 | DCG31/ DCG32 | DCG41/ DCG42 |
| $ACG_M$ : ADDITIONAL DC CONTROL CONVERSION TABLE | | ACG1 | ACG2 | ACG3 | ACG4 |

| $EZ\_a$ | M=ncgdet(Code Word a) |
|---|---|
| 0 | 1 |
| 1 | 2 |
| 2~4 | 3 |
| 5~ | 4 |

FIG. 11

| M | L |
|---|---|
| 1 | 9 |
| 2 | 6 |
| 3 | 41 |
| 4 | 98 |

FIG. 12

| mc[n−2] → mc[n−2]$_{new}$ | mc[n−1] |
|---|---|
| xxxxxxxx001001<br>→ xxxxxxxx001000 | 0100xxxxxxxxxxxx |
| xxxxxxxx010001<br>→ xxxxxxxx010000 | |
| xxxxxxxx100001<br>→ xxxxxxxx100100 | |
| ~ | |
| xxx100000000001<br>→ xxx100000000100 | |

CODING AND DECODING METHOD OF SUPPRESSING DC COMPONENT IN CODESTREAM

CROSS-REFERENCE TO RELATED APPLICATIONS

This application claims the benefit of Korean No. 2001-31452, filed Jun. 5, 2001, in the Korean Industrial Property office, the disclosure of which is incorporated herein by reference.

BACKGROUND OF THE INVENTION

1. Field of the Invention

The present invention relates to a method of converting and demodulating a code for source data to be recorded on an optical information storage medium, and more particularly, to a coding and decoding method of more effectively performing a direct current (DC) suppression control of a code stream.

2. Description of the Related Art

In general, an eight to fourteen modulation plus (EFM+) method is a data modulation method used in an optical information storage medium such as a digital versatile disc (DVD). The EFM+ method has a code characteristic of 2, 10, 8, or 16. This indicates that a minimum run length, for example, a minimum length (number) of continuous zeros, of a code stream, is 2 bits, a maximum run length is 10 bits, a length of source data is 8 bits, and a length of a conversion codeword is 16 bits.

FIG. 1 is a block diagram of an example of an EFM+ conversion code group formation. An EFM+ conversion code group includes four main conversion code groups and four corresponding code groups for a DC suppression control. The main conversion code groups are codeword groups into which source data are ordinarily converted. The corresponding code groups for the DC suppression control are codeword groups specially formed to suppress DC components in a code stream, and a codeword of the codeword groups corresponds to a source data item only when a value of the source data item is less than or equal to 87. If the value of the source data item to be converted is less than or equal to 87, a codeword for the source data can be selectively obtained from the corresponding code group for the DC suppression control or the main conversion code group in order to suppress the DC components in the code stream.

As described above, in the conventional EFM+ code modulation method, unless the source data being input (or to be recorded) is less than or equal to a predetermined value (for example, 87), the DC suppression control cannot be performed. That is, the conventional EFM+ method uses a probabilistic method and cannot provide a continuous predictable DC suppression. In this method, it is more disadvantageous that the DC component of the code stream is not sufficiently suppressed in a code having a lower probability of the DC suppression control compared to a code having a higher probability of the DC suppression control. Especially, if the DC component is in a servo band or an RF detection band, a performance of the servo or data detection band may be adversely affected.

SUMMARY OF THE INVENTION

To solve the above problems, it is an object of the present invention to provide a code conversion and demodulation method of performing a continuous predictable DC suppression control.

Additional objects and advantageous of the invention will be set forth in part in the description which follows and, in part, will be obvious from the description, or may be learned by practice of the invention.

To achieve the above and other objects, according to an embodiment of the present invention, there is provided a codeword conversion method of converting source data into a codeword to be recorded on an optical information storage medium. The method includes inputting the source data, determining whether or not controlling of a direct current (DC) component of a code stream has to be performed, and if a DC control has to be performed, converting the source data into a first codeword based on one of first code groups formed for the DC control, if the DC control is not to be performed, converting the source data into a second codeword corresponding to the source data based on one of second code groups formed according to a format for recording data on the optical information storage medium, determining a code group to be used for converting next source data according to the number of end zeros of the converted codeword, and examining the boundary of codewords of the code stream formed by adding the converted codeword and a previously converted codeword, and if the boundary does not satisfy a predetermined condition, changing the previously converted codeword.

It is possible that a time for the DC control of the code stream is set so that the DC control is cyclically performed for input data.

It is possible that a code group having the number of lead zeros satisfying a predetermined run length condition according to the number of the end zeros of the converted codeword is determined as a code group used for converting the next source data.

It is possible that when the DC control has to be performed, a codeword that is advantageous to suppress the DC component in the code stream is selected from two codeword groups, each group having one codeword of a codeword pair of a plurality of codeword pairs, and the codewords of the codeword pair that have opposite parities and have an identical code group to follow either of the codewords of the codeword pair.

It is possible that when the DC control is not to be performed, a codeword conversion group is selected between a main conversion code group having codewords corresponding to all source data items and an auxiliary conversion code group for the DC control having codewords that have the same length as the codewords of the main conversion code group and is generated to suppress the DC components.

It is possible that the lengths of the codewords of the main conversion code group and auxiliary conversion code group for the DC control are 15 bits long, and the codeword selected when DC control has to be performed is 17 bits long.

Also, to achieve the above and other objects of the present invention, there is provided a code conversion method of controlling a suppression of the DC component contained in the code stream when the source data is converted into a code to be recorded on an optical information storage medium. The method includes determining a control timing for suppressing the DC component of the code stream to which the source data are converted, performing a code conversion at each control time for the DC component so that the code stream branches into a pair of branch code streams one of which extends in a direction where a running digital sum (RDS) of the code stream increases, and another one of which extends in a direction where the RDS of the code stream decreases, and selecting a path of the code stream that has a most bounded path around RDS '0' from paths of the branch code streams branching each control time.

It is possible that in selecting of the path of the code stream from the paths of the plurality of branch code streams, the path of the code stream is selected to have the smallest value obtained when the maximum values of absolute values of respective RDSs of the branch code streams are compared with each other.

It is possible that in selecting of the path of the code stream from the paths of the plurality of branch code streams, if there are the branch code streams having an identical maximum value (a first step maximum value) in the absolute values of respective RDSs of the branch code streams, one that is not the maximum value of the absolute values of upper and lower limits of the code stream (a second step maximum value) is selected from the absolute values of the upper limit and the lower limit of each code stream, and after comparing the selected values of the branch code streams, the path of a branch code stream having a smaller value is selected.

It is possible that in selecting of the path of the code stream from the paths of the plurality of branch code streams, if there are the branch code streams having an identical first step maximum value and an identical second step maximum value, the sums of absolute values of RDS of respective branch code streams are compared, and a branch code stream having a smaller sum is selected.

It is possible that if there are branch code streams having an identical first step maximum value, an identical second step maximum value, and an identical sum of the absolute values of the RDSs, frequencies of a zero crossing of the RDS values of respective branch code streams are compared and a branch code stream having a highest frequency is selected.

Also, to achieve the above and other objects of the present invention, there is provided a codeword demodulation method of demodulating a codeword read from an optical information storage medium. The method includes reading a codeword, if a DC suppression control is performed in a code conversion, finding a code group corresponding to the read codeword in a pair of first code conversion tables each having one codeword having one of opposite parities, finding source data corresponding to the found codeword, and demodulating the codeword, and if DC suppression control is not performed in code conversion, finding source data corresponding to the read codeword in a second code conversion table.

It is possible that the first code conversion tables and the second code conversion table have 17 bits long codewords and 15 bits long codewords, respectively.

It is possible that the second code conversion table is selected between a main conversion table which has groups classified by the number of end zeros, each group having codewords corresponding to all possible source data, and an auxiliary DC control conversion table which is formed by surplus codewords taken out from the groups of the main conversion table.

BRIEF DESCRIPTION OF THE DRAWINGS

These and/or other objects and advantages of the invention will become apparent and more readily appreciated from the following description of the preferred embodiments, taken in conjunction with the accompanying drawings of which:

FIG. 2 is a main table showing a variety of codeword groups of a main conversion table from conversion code tables and characteristics of the codeword groups according to an embodiment of the present invention;

FIG. 3 is a DC control conversion table showing a variety of codeword groups for DC control and the characteristics of the codeword groups;

FIG. 4 is an auxiliary conversion table showing a variety of codeword groups for DC control and the codeword characteristics of the respective codeword groups;

FIGS. 5A through 5E are main conversion code tables generated according to codeword generating conditions;

FIGS. 6A through 6J are DC control conversion code tables generated according to codeword generating conditions;

FIGS. 7A and 7B are auxiliary conversion code tables generated according to codeword generating conditions.

FIG. 11 is a table showing the numbers of source data items using an auxiliary conversion group for a DC control (ACG);

FIG. 12 is a table showing codeword conversion rules generated when codewords having the numbers of end zeros, which is 1, and the number of lead zeros which is 0 are combined;

DETAILED DESCRIPTION OF THE PREFERRED EMBODIMENTS

Figure 1:
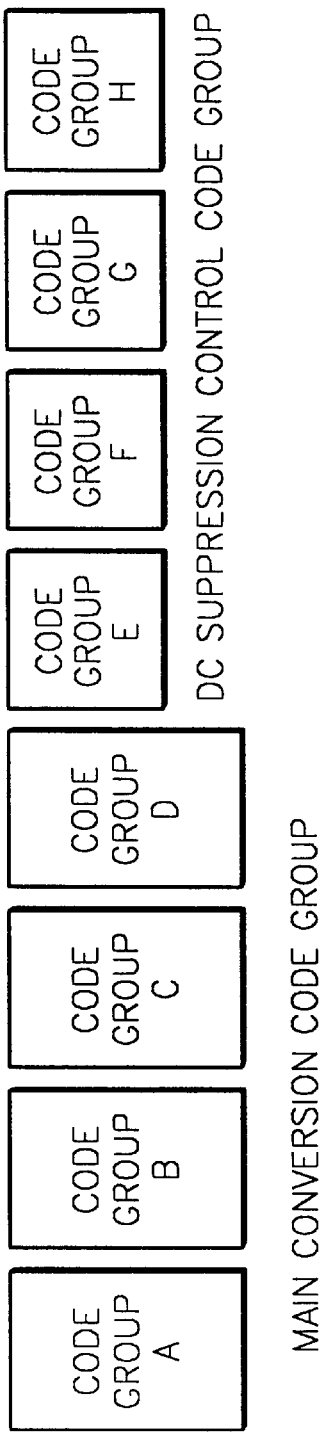
FIG. 1 is a block diagram of an example of a conventional EFM+ conversion code group formation.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

FIG. 2 is a main conversion table showing a variety of codeword groups to be used in the present invention, and codeword characteristics of the codeword groups. Here, d denotes a minimum run length limit of a code or a codeword, k denotes a maximum run length limit, m denotes the number of bits of source data, n denotes the number of bits of the codeword after modulation, an end zero (EZ) indicates the number of a series of '0''s that continue in a first direction from the least significant bit (LSB) to the most significant bit (MSB) in the codeword, and a lead zero (LZ) indicates the number of a series of '0''s that continue in a second direction from the MSB to the LSB in the codeword.

For example, codewords with d=0, k=10, m=8, n=15, $0 \leq EZ \leq 8$ can be classified according to an LZ condition as:

1) the number of codewords satisfying $2 \leq LZ \leq 10$: 177;
2) the number of codewords satisfying $1 \leq LZ \leq 9$: 257;
3) the number of codewords satisfying $0 \leq LZ \leq 6$: 360; and
4) the number of codewords satisfying $0 \leq LZ \leq 2$: 262

If the number of bits of the source data is equal to 8, the number of codewords for conversion should be 256 or more. However, in condition 1), the number of codewords does not amount to 256. Therefore, the number of the codewords in condition 1) can amount to 256 by taking some codewords from a condition having a number of surplus codewords. In this case, 83 surplus codewords are taken out from the codewords satisfying LZ condition 3) and added to condition 1). Then, the numbers of the codewords included in conditions 1) through 4) are 260, 257, 277(=360−83), and 262, respectively, and satisfy a minimum number of modulation codewords, that is, 256 for 8-bit source data.

In the table of FIG. 2, a main code group 1 (MCG1) is a codeword group containing codewords satisfying condition 1) and a predetermined number (83) of the surplus codewords that are taken from the codewords satisfying condition 3). An MCG2 is a codeword group containing the codewords satisfying condition 2). An MCG3 is a codeword group containing the codewords satisfying condition 3) excluding the surplus codewords taken by the MCG1. An MCG4 is a group containing the codewords satisfying condition 4). In each of the main code groups MCG1 through MCG4, only 256 codewords can be used as conversion codes for source codes.

FIG. 3 is a DC control conversion table showing a variety of codeword groups for a DC suppression control and the codeword characteristics of the codeword groups. For example, if it is assumed that the characteristics of codewords are d=2, k=10, m=8, n=17, and $0 \leq EZ \leq 8$, the DC control conversion table may include the following four DC control code groups (DCG1 through 4 of FIG. 4 in ascending order) according to the LZ condition.

1) the number of codewords satisfying $2 \leq LZ \leq 10$: 375;
2) the number of codewords satisfying $1 \leq LZ \leq 9$: 546;
3) the number of codewords satisfying $0 \leq LZ \leq 6$: 763; and
4) the number of codewords satisfying $0 \leq LZ \leq 2$: 556.

Since each DC control code group of the DC control conversion table for the DC suppression control should have at least two codewords that can selectively correspond to identical source data, at least 512 or more codewords are needed for the 8-bit source data. Each of the four DC control code groups has a pair of codewords corresponding to each of the 256 8-bit source data. Each of the codeword pair belongs to one of two sub-groups DCGn1 and DCGn2 (n=1, 2, 3, 4). Since the number of codewords in the code group satisfying the LZ condition 1) is less than 512, a DC control code group 1) (DCG1) can take surplus codewords from other code groups satisfying other LZ conditions to amount to the number of 512. For example, the DCG1 may take 177 surplus codewords from the other DC control code group satisfying the condition 3) and LZ=1 so as to have 552 (=375+177) codewords. A DCG2 having codewords satisfying condition 2) includes 546 codewords. A DCG3 having codewords satisfying condition 3) includes the remaining 586 codewords excluding 177 codewords transferred to the DCG1 group. A DCG4 having codewords satisfying condition 4) includes 556 codewords.

FIG. 4 is an auxiliary conversion table showing a variety of codeword groups for the DC suppression control and the codeword characteristics of the respective codeword groups. The auxiliary code groups for DC control in the auxiliary conversion table of FIG. 4 are represented by ACG1, ACG2, ACG3, and ACG4, respectively. In this embodiment, among codewords satisfying d=2, k=10, m=8, and n=15, the codewords satisfying $9 \leq EZ \leq 10$, the remaining codewords of the main conversion groups (MCGs), and the codewords satisfying LZ=7, 8, or LZ=4, 5 are used as codewords of auxiliary code groups for DC suppression control (ACGs). More specifically, conditions for generating these codewords are as follows.

1) 5 codewords (satisfying $9 \leq EZ \leq 10$ and LZ≠0)+the remaining 4 codewords in the MCG1=9 codewords,
2) 5 codewords (satisfying $9 \leq EZ \leq 10$ and LZ≠0)+ remaining codeword in the MCG1=6 codewords,
3) 5 codewords (satisfying $9 \leq EZ \leq 10$ and LZ≠1)+21 remaining codewords in the MCG3+15 codewords (satisfying $7 \leq LZ \leq 8$ and $0 \leq EZ \leq 8$)=41 codewords, and
4) 7 codewords (satisfying $9 \leq EZ \leq 10$)=the remaining 6 codewords in the MCG4+85 codewords (satisfying $3 \leq LZ \leq 5$ and $0 \leq EZ \leq 8$)=98 codewords.

Since the number of the auxiliary code groups of FIG. 4 is limited, and since each of the ACG code groups cannot supply sufficient codewords corresponding to all source data, only a limited number of the codewords in a predetermined range can be converted as in a conventional EFM+ code conversion method.

FIGS. 5A through 5E are main conversion code tables generated according to codeword generating conditions. FIGS. 6A through 6J are DC control conversion code tables for the DC suppression control generated according to the codeword generating conditions. FIGS. 7A and 7B are auxiliary conversion code tables for the DC suppression control generated according to the codeword generating conditions.

According to an embodiment of the present invention, there is provided a method of performing a code conversion using the code groups generated as described above and selecting the codeword so that the DC suppression control of DC components in a code stream having converted codewords is possible.

When the source data codes are converted into the codeword, and unless the DC suppression control is not performed, the source data is converted using a 15-bit codeword from the main code group. When the DC suppression control is performed, the source data is converted using a 17-bit codeword from the DC control code group for the DC suppression control. When the DC suppression control is not performed, as in the EFM+ code modulation method, and when the source data is within a predetermined range, the 15-bit codewords from the auxiliary code groups of the auxiliary conversion table for the DC suppression control capable of controlling the DC components can be used. In this sense, the conversion table having different length codewords is used depending on whether the DC suppression control has to be performed, and these different length codewords will be referred to as a combination code (Combi-Code).

The characteristics of the Combi-Code can be briefly presented as follows.

1) A Combi-Code is a combination of two types of codewords having different lengths corresponding to the 8-bit source data.
2) A Combi-Code rate is 8/(15+α), where a is a value between 0 and 1, and the Combi-Code rate is determined by a frequency of codewords for the DC suppression control.
3) The DC suppression control is not performed randomly or on a probabilistic base according to source data values, and a predictable DC suppression control is guaranteed by performing the code conversion with the 17-bit codewords for the DC suppression control within each predetermined cycle.
4) A pair of codewords capable of performing the DC suppression control have parity bits being opposite to each other and indicate an identical code group when selecting a code group of the source data which will follow the codewords.

Figures 8, 9, 10:
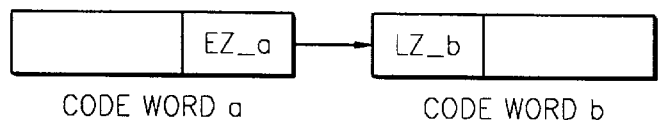
FIG. 8 is a diagram showing a code stream having two branch codewords.
FIG. 9 is a table classifying code conversion tables of FIGS. 5A through 7B by an index M.
FIG. 10 is a table showing conditions for determining a next code group according to end zeros of a current codeword.

FIG. 8 is a diagram showing a code stream having two codewords, i.e., a preceding codeword "a" and a following codeword "b". When the code stream is generated, the end zero (EZ_a) of the preceding codeword "a" and the lead zero (LZ_b) of the following codeword "b" should always be considered so that a predetermined boundary rule or a run length constraint can be satisfied.

FIG. 9 is a table showing the main, DC control, and auxiliary (additional DC control) conversion tables of FIGS. 5A through 7B by index M. The first main conversion code group (MCG1), the first conversion DC conversion code groups (DCG11 and DCG12) and the first auxiliary conversion code group (ACG1) correspond to an index M that is equal to 1. The second main conversion code group (MCG2), the second DC control conversion code groups (DCG21 and DCG22), and the second auxiliary conversion code group (ACG2) correspond to an index 2. The third main conversion code group (MCG3), the third DC control conversion code groups (DCG31 and DCG32), and the third auxiliary conversion code group (ACG3) correspond to an index 3. Fourth main conversion code group (MCG4), fourth DC control conversion code groups (DCG41 and DCG42), and fourth auxiliary conversion code group (ACG4) correspond to an index 4. Here, codewords of the code groups having the same index have the same end zeros.

FIG. 10 is a table showing conditions for determining a next code group having a next codeword (the following codeword "b") according to the end zeros of a current codeword (the preceding codeword "a"). According to the number of end zeros of the current (preceding) codeword "a" (EZ_a), a group of codewords having the next (following) codeword "b" to follow the current (preceding) codeword "b" is determined. If the number of the end zeros of the preceding codeword "a" is 0, the following codeword "b" to which the following source data is converted should be selected from the code groups whose index M is equal to 1, that is, a first group (MCG1) from the main conversion code groups, first groups (DCG11 and DCG12) from the DC control conversion code groups, or a first group (ACG1) from the auxiliary conversion code groups.

If the number of the end zeros of the preceding codeword "a" is equal to 1, the following codeword "b" to which the following source data is converted should be selected from the code groups whose index (M) is equal to 2, that is, a second group (MCG2) from the main conversion code groups, second groups (DCG21 and DCG22) from the DC control conversion code groups, or a second group (ACG2) from the auxiliary conversion code groups.

If the number of the end zeros of the preceding codeword "a" is 2, 3, or 4, the following codeword "b" to which the following source data is converted should be selected from the code groups whose index (M) is 3, that is, a third group (MCG3) from the main conversion code groups, third groups (DCG31 and DCG32) from the DC control conversion code groups, or a third group (ACG3) from the auxiliary conversion code groups. If the number of the end zeros of the preceding codeword "a" is equal to or greater than 5, the following codeword "b" to which the following source data is converted should be selected from the code groups whose index M is equal to 4, that is, a fourth group (MCG4) from the main conversion code groups, fourth groups (DCG41 and DCG42) from the DC control conversion code groups, or a fourth group (ACG4) from the auxiliary conversion code groups.

FIG. 11 is a table showing the number L of the source data that can use the auxiliary conversion group (ACG). If the DC suppression control is performed, if the index (M) is determined as equal to 1, and if a value of the source data is 0~8, the code conversion of the source data can be performed using the conversion table of ACG1. This is because the code group ACG1 have only codewords corresponding to the source data values of 0~8. Likewise, when the index M is determined as equal to 2, the source data values that can use conversion code group ACG2 are 0~5. When the index M is determined as equal to 3, the source data values that can use conversion code group ACG3 are 0~40. When the index M is determined as equal to 4, the source data values that can use conversion code group ACG4 are 0~97.

FIG. 12 is a table showing codeword conversion rules generated when codewords are combined and when the number of the end zeros of the preceding codeword "a" is 0 and the number of lead zeros of a following codeword is 1. When it is assumed that the preceding codeword "a" is mc[n−2] and the following codeword "b" is mc[n−1], and if the number of the end zeros of mc[n−2] is 0 and the number of the lead zeros of mc[n−1] is 1, the codeword mc[n−2] converted into mc[n−2]new that satisfies a minimum run length condition, that is, the condition that the length (number) of continuous zeros should be equal to or greater than 2. For example, in the code stream in which mc[n−2] is 'xxxxxxxxx001001' and mc[n−1] is '0100xxxxxxxxxxx, mc[n−2] is converted into mc[n−2]new that is 'xxxxxxxxx001000'.

When a next code group NCG is determined as shown in FIG. 10, a situation where the (d, k) constraint is not satisfied in a codeword occurs when the source data are converted by using codewords that belong to a code group containing the surplus codewords taken from other code groups among the groups of the main conversion tables or the DC control conversion tables because of shortage of codewords (this will be referred to as a violation of the boundary rule). FIG. 12 shows this situation where the boundary rule violation occurs and each format of the codewords converted at this time (situation).

Figure 13:
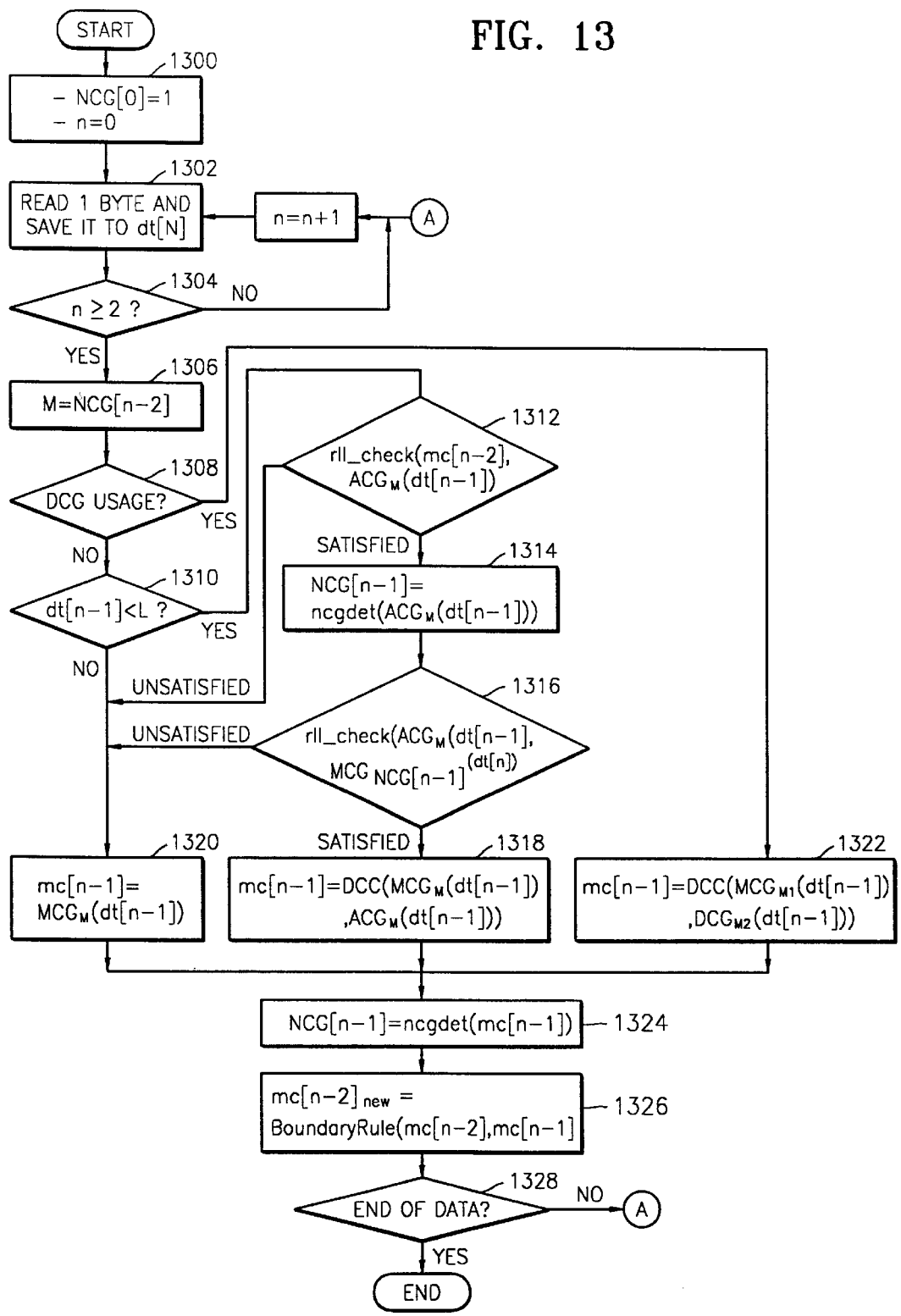
FIG. 13 is a flowchart showing a code conversion method using a combination code (Combi-Code) according to another embodiment of the present invention.

FIG. 13 is a flowchart showing a code conversion method using a combination code (Combi-Code) according to another embodiment of the present invention. The initial index of a code group to be converted is set to 1 (NCG[0]=

1), and the counter of the source data is set to 0 (n=0) in operation 1300. Source data (dt[n]) are read and stored in operation 1302 until n becomes 2. Then, in operation 1304, it is checked whether n is equal to or greater than 2. If n is equal to or greater than 2 as determined in the table of FIG. 10, the index of the next conversion code group according to the number of the end zeros of the preceding codeword "a" is determined (M=NCG[n−2]) in operation 1306. Then, it is determined whether the DC suppression control of the code stream is performed in operation 1308. If the DC suppression control is not performed, it is determined whether input source data (dt[n−1]) can be converted according to an auxiliary conversion table for the DC suppression control as shown in FIG. 11 (dt[n−1]<L) in operation 1310.

If the code conversion according to the auxiliary conversion table can be performed, it is checked in operation 1312 whether the previous (preceding) codeword (mc[n−2]) and the current (following) source data dt[n−1] cause a run length constraint violation in the code stream formed by the following codeword (ACG$_M$(dt[n−1])) of the auxiliary code group having the index determined in operation 1306 (rll_check(mc[n−2],ACG$_M$(dt[n−1]). This is to determine whether the length obtained by adding the end zeros of the previously converted (preceding) codeword mc[n−2] to the lead zeros of the following codeword ACG$_M$(dt[n−1]) in the auxiliary conversion table to be converted at present satisfies a predetermined run length condition, for example, to determine whether the length is equal to or longer than the minimum run length d=2, and equal to or shorter than the maximum run length k=10.

However, in generating the Combi-Code as described above, since some code groups have the surplus codewords taken from other code groups having different end zero lengths, the range between the minimum run length and the maximum run length may not be satisfied when the surplus codewords from other groups form the code stream with other codewords. When these code groups are considered in performing a Combi-Code conversion, if the number of the end zeros of a preceding codeword "a" is 0 and the number of the lead zeros of the following codeword "b" is 1, this is not regarded as a violation of the run length condition but as an exceptional condition. This is regarded as a violation of the boundary rule explained referring to FIG. 12, and an appropriate code conversion for this case can be performed later.

Excluding the exceptional condition described above, if the run length violation occurs, the source data dt[n−1] which is input at present should be converted into a codeword of the main conversion code groups (mc[n−1]=MCG$_M$(dt[n−1])) in operation 1320. If the violation of the run length condition does not occur in the code stream of the previously input and converted (preceding) codeword (mc[n−2]) and the following codeword (mc[n−1]) in the auxiliary conversion table to be converted at present, the index of the next code conversion group is determined according to the number of the end zeros of the codeword of the current data dt[n−1] as shown in the table of FIG. 10 (NCG[n−1]= ncgdet(ACG$_M$(dt[n−1])) in operation 1314. It is determined again whether the a run length violation occurs in the code stream formed by the codeword ACG$_M$(dt[n−1]) in the auxiliary conversion table of the source data dt[n−1] to be converted at present, and the codeword MCG$_{NCG[n−1]}$(dt[n]) in the main conversion code group which has the index determined in operation 1314, and to which the following data dt[n] will be converted (rll_check(ACG$_M$(dt[n−1], MCG$_{NCG[n−1]}$(dt[n])) in operation 1316.

Excluding the exceptional condition described above, if the violation of the run length condition occurs in the code stream, the code conversion of the current data dt[n−1] according to the main conversion table in operation 1320 should be performed. If the violation of the run length condition does not occur, a codeword that is advantageous to the DC suppression control of the code stream is selected between the codeword MCG$_M$(dt[n−1]) of the main conversion code group to which the currently input source data can be converted and the codeword ACG$_M$(dt[n−1]) of the auxiliary control conversion group (mc[n−1]=DCC(MCG$_M$(dt[n−1]), ACG$_M$(dt[n−1]))) in operation 1318.

If it is determined in operation 1308 that the DC suppression control of the input source data is performed, a codeword that is advantageous to the DC suppression control of the present code stream is selected among the codewords belonging to a pair of groups (DCG$_M$1 and DCG$_M$2) having the index which is previously determined from the DC control code groups, and is used as the codeword of the input data (mc[n−1]=DCC(DCC$_{M1}$(dt[n−1], DCG$_{M2}$(dt[n−1]))) in operation 1322. If the code conversion of dt[n−1] is performed in step 1318, 1320 or 1322 according to the number of the end zeros of the converted codeword, an index to be used in the code conversion of the following source data is determined as shown in FIG. 10 (NCG[n−1]=ncgdet(mc[n−1])) in operation 1324.

When the codeword mc[n−1] which is converted from the source data dt[n−1] which is currently input is connected to the codeword mc[n−2] which is converted from the previously input source data dt[n−2], the codeword format of mc[n−2] is converted as in FIG. 12 (mc[n−2]$_{NEW}$=BoundaryRule(mc[n−2],mc[n−1]) in operation 1326 if the violation of the boundary rule occurs as shown in FIG. 12. In operation 1328, it is determined whether there are the source data to be converted. If there are the source data to be converted, operations starting from point A in FIG. 13 are performed again. If there are no source data to be converted, the code conversion stops. For example, the DC suppression control is determined in such a way that the DC suppression control is performed for every n-th byte of the data stream being input. Accordingly, the codewords in the DC control conversion tables are regularly used.

Figure 14:
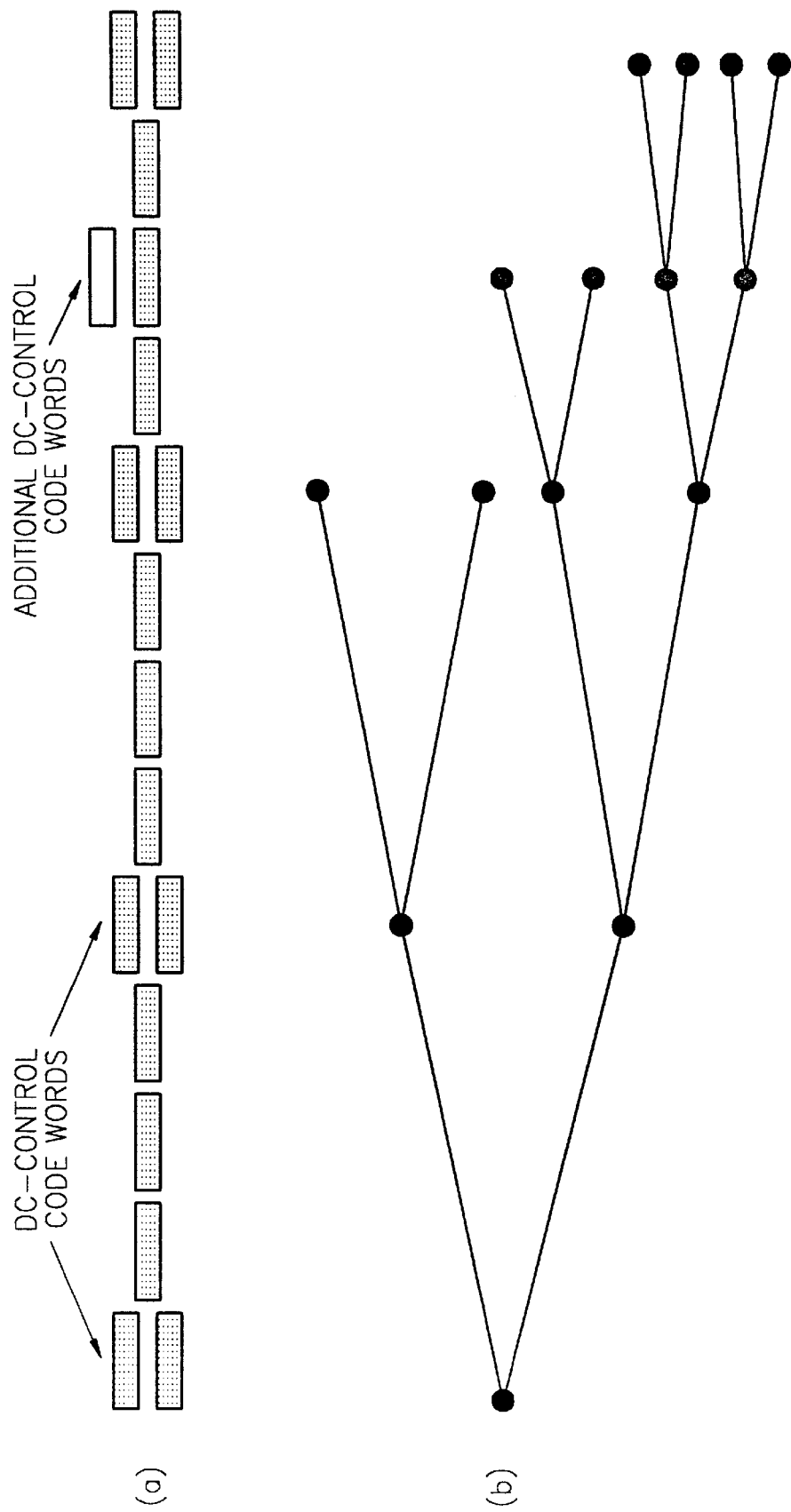
FIG. 14A is a diagram showing regular DC suppression control being performed in a code stream which is modulated using the Combi-Code of FIG. 13.
FIG. 14B is a diagram of a code stream tree in which the code stream of the Combi-Code of of FIG. 13 spreads out.

FIG. 14A is a diagram showing the code stream being modulated using the Combi-Code according to another embodiment of the present invention. It is shown in FIG. 14A that the DC suppression control is regularly performed. In an example of FIG. 14A, it is shown that the code conversion capable of performing the DC suppression control is performed for every fourth source data. A codeword to which the fourth source data item is converted is selected in the DC control conversion table including DCG groups, and as the codeword, a codeword that is advantageous to DC component suppression of a code stream is selected among codeword pairs, each having opposite INVs (or parities) in the selected DCG group. FIG. 14B is a tree diagram of a Combi-Code code stream of FIG. 14A. Since a code stream can be branched into a pair of different directions that can be selected each time when the DC suppression control is performed, the code stream tree as shown in FIG. 14B can be generated.

The number (amount) of the DC components in a code stream can be analyzed mainly by using a power spectrum density, which is represented by a running digital sum (RDS) of the code stream. Assuming that the code stream is $x_i$ and RDS is $z_i$, $x_i$ and $z_i$ are $x_i=[\ldots, x_{i−1}, x_i, x_{i+1}, \ldots]$, $x_i \square [−1, 1]$, and $$z_i = \sum_{j=-\infty}^{i} x_j = z_{i-1} + x_i,$$

respectively.

Figure 15:
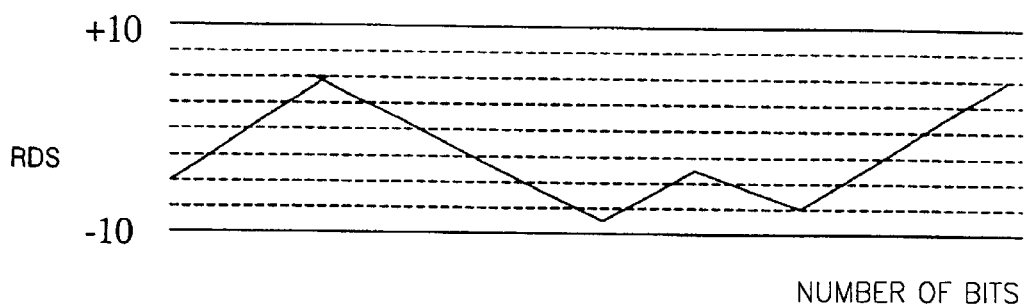
FIG. 15 is a graph showing an example of a running digital sum (RDS) of a code stream.
Figure 16:
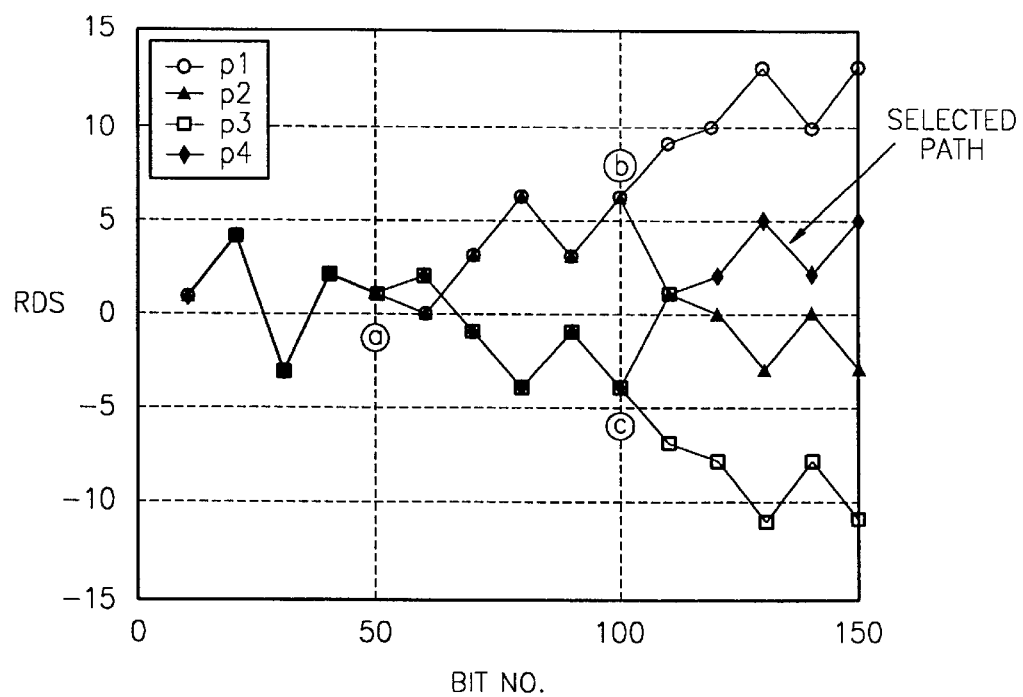
FIG. 16 is a graph showing examples of a plurality of paths of a codeword which branches when a DC control occurs in converting a codeword.

FIG. 15 is a graph showing an example of the RDS defined above. FIG. 16 is a graph showing examples of a plurality of paths of branch code streams which are generated as a result of branching of the preceding codeword when the DC suppression control occurs in converting the codewords. As in FIG. 14(b), there are two branch codewords that can be selected when the DC suppression control occurs, and the RDS of code stream branches to the two different directions. This characteristic guarantees the DC suppression control of the Combi-Code. In FIG. 16, at a point (a), the code stream branches into a first path and a third path because of a first codeword pair capable of performing the DC suppression control.

At a point (b), the first path branches into the first path and a second path, while at a point (c), the third path branches into the third path and a fourth path. The RDS directions of respective branched path pairs, that is, the first path and the third path, the first path and the second path, and the third path and the fourth, are maintained in the different directions. By this characteristic, even though the RDS value of a path distances from 0, the RDS value of the other path approaches 0. Accordingly, the code stream having a path becoming near 0 is selected so that the DC component of the code stream can be removed. By this characteristic, the code conversion method using the Combi-Code can guarantee the DC suppression control.

Unlike the conventional method in which the code stream having the smallest value among sums of absolute values or squares of the RDSs of each of code streams that can be substituted is selected and then the DC suppression control is performed, a most bounded path from the plurality of possible paths of the code stream (a) shown in FIG. 16 is determined and selected as being advantageous to the DC suppression control. The selection of the most-bounded path is determined by a priority which will now be explained. A greatest absolute value between a lower limit value and an upper limit value of the RDS of each code stream path is regarded as a first step maximum absolute value (or first maximum absolute value), and a path having a smallest maximum value from the paths is selected as a code stream for the DC suppression control. Examples of the selection of a path are presented as follows:

|  | path 1 | path 2 | path 3 | path 4 |
| --- | --- | --- | --- | --- |
| First example: | | | | |
| upper limit | 5 | 5 | 8 | 3 |
| lower limit | −5 | −10 | −10 | −7 |
| maximum absolute value | 5 | 10 | 10 | 7 |
| Second example: | | | | |
| upper limit | 5 | 4 | 5 | 2 |
| lower limit | −5 | −5 | −3 | −5 |
| maximum absolute value | 5 | 5 | 5 | 5 |
| second step maximum absolute value | 5 | 4 | 3 | 2 |

In the first example, path 1 whose absolute maximum value is the smallest one is selected as the code stream which is advantageous to the DC suppression control. In the second example, the maximum absolute values are all the same. In this case, the path 4 whose second maximum absolute value between the lower limit value and the upper limit value of the RDS, is the smallest one is selected as a code stream which is advantageous to the DC suppression control.

| Third example: | path 1 | path 2 | path 3 | path 4 |
| --- | --- | --- | --- | --- |
| upper limit | 5 | 3 | 5 | 3 |
| lower limit | −3 | −5 | −3 | −5 |
| maximum absolute value | 5 | 5 | 5 | 5 |
| second step maximum absolute value | 3 | 3 | 3 | 3 |
| \|RDS\| sum | 14 | 15 | 13 | 19 |

If the maximum absolute values and the second maximum absolute values are the same in all paths, a path which has the smallest sum of |RDS| of the path from all paths is selected and used as the code stream for the DC suppression control.

| Fourth example: | path 1 | path 2 | path 3 | path 4 |
| --- | --- | --- | --- | --- |
| upper limit | 5 | 3 | 5 | 3 |
| lower limit | −3 | −5 | −3 | −5 |
| maximum absolute value | 5 | 5 | 5 | 5 |
| second step maximum absolute value | 3 | 3 | 3 | 3 |
| \|RDS\| sum | 15 | 15 | 15 | 15 |
| The number of zero crossing | 21 | 10 | 8 | 13 |

If the maximum absolute values, the second maximum absolute values, and sums of |RDS| are the same in all paths, a path where zero crossing occurs most frequently, that is, the path 1 in the fourth example, is selected. In paths of each code stream of FIG. 16, the RDS change of path 1 is −3~13, the RDS change of the path 2 is −3~6, the RDS change of the path 3 is −11~4, and the RDS change of the path 4 is −4~5. Here, the path 4 which has the lowest upper limit and the highest lower limit is selected as a code stream path which is advantageous to the DC suppression control.

Figure 17:
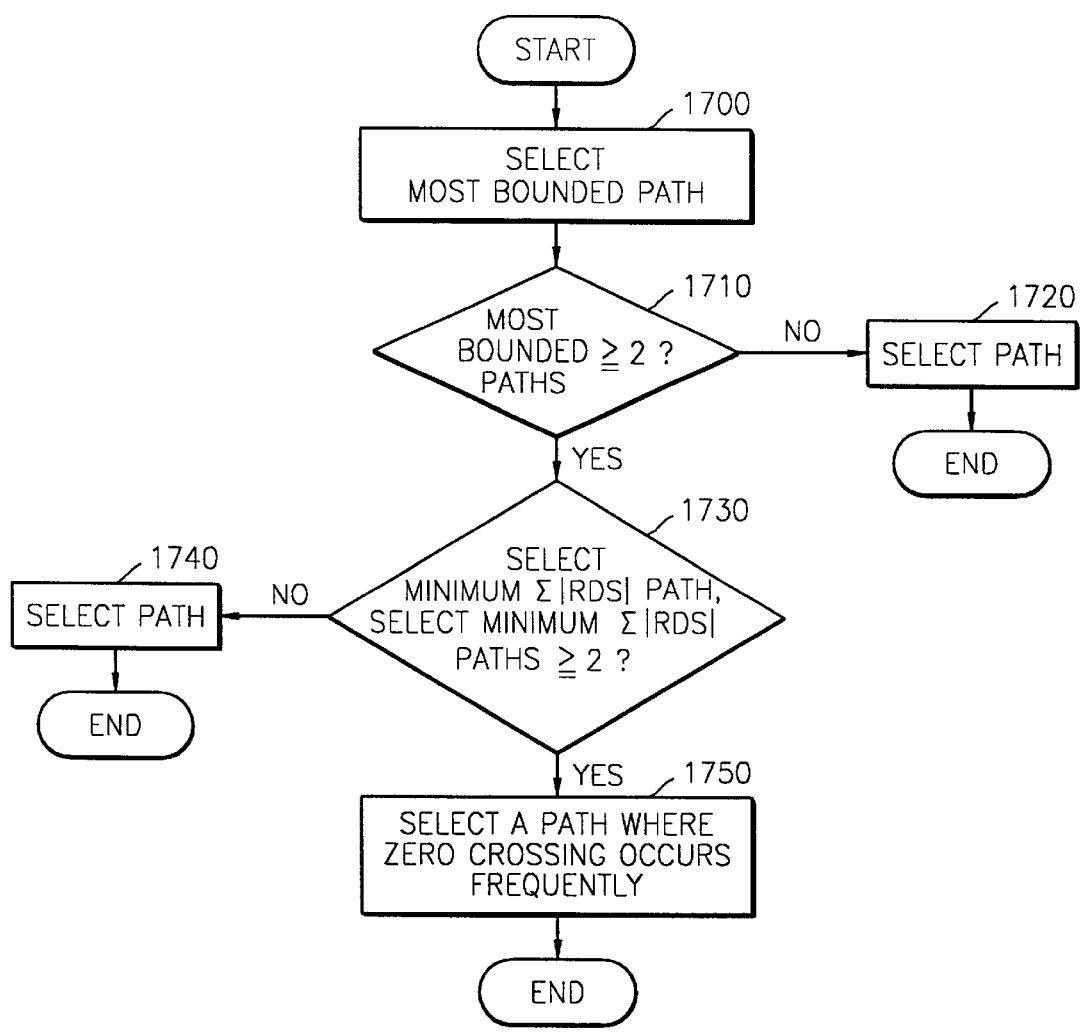
FIG. 17 is a flowchart of a method for selecting a code stream for DC suppression control.

FIG. 17 shows the code stream selection method for the DC suppression control described above. First, a path which is most bounded is selected from the code stream paths in operation 1700. It is determined whether the number of most bounded paths is equal to or greater than 2 in operation 1710. If the number of most bounded paths is not equal to or greater than 2, the selected code stream path is selected in operation 1720. If the number of most bounded paths is equal to or greater than 2, a path having the smallest absolute value of the RDS is sought and it is determined whether the number of the paths having the smallest absolute value of the RDS is equal to or greater than 2 in operation 1730. If the number of the paths having the smallest absolute value of the RDS is not equal to or greater than 2, the path having the smallest absolute value of the RDS is selected in operation 1740, else a path in which crossing between the RDS value and 0 occurs most frequently, that is, a path in which zero crossing occurs most frequently is selected in operation 1750.

According to this embodiment of the present invention, by selecting the most bounded path, the DC component of a code stream can be effectively suppressed by about 1~2 dB more than in the conventional method of selecting a path having the smallest one of sums of the absolute values of the RDS.

Figure 18:
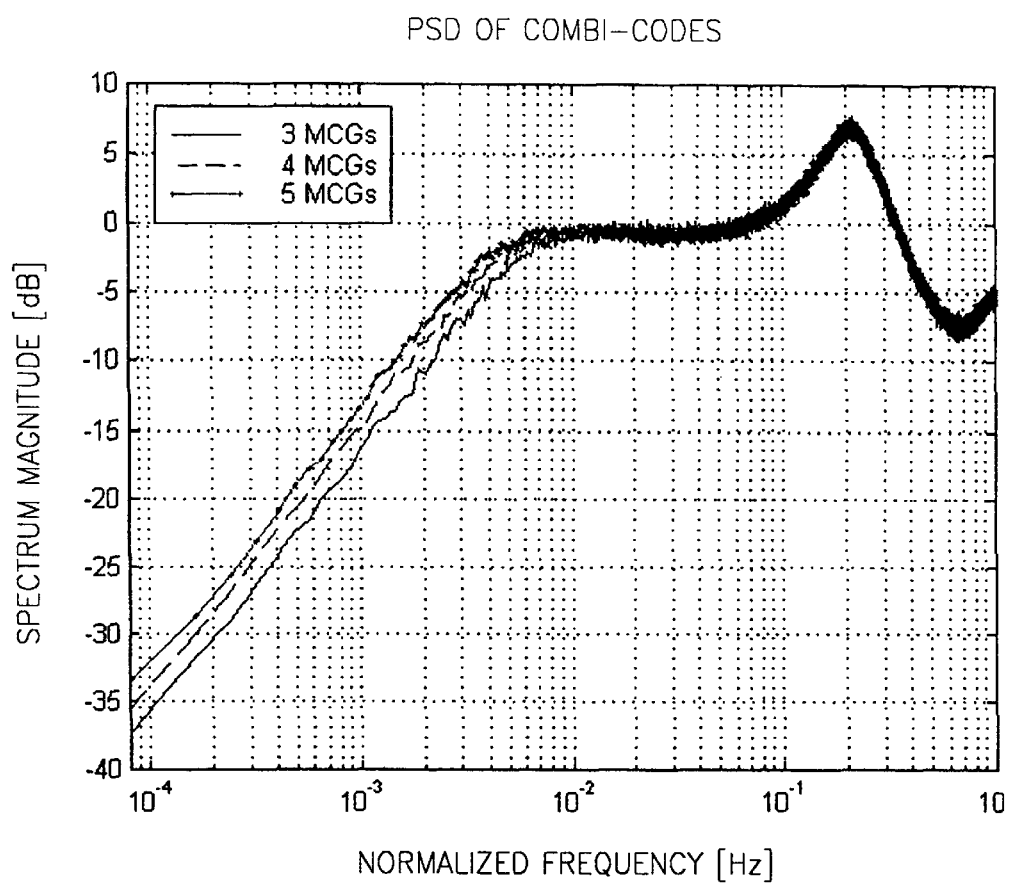
FIG. 18 is a graph showing a power spectrum density (PSD) of a code stream according to the frequency of using DCG codewords when DC suppression control is performed using a DCG code conversion table of the present invention.

FIG. 18 is a graph showing a power spectrum density (PSD) of a code stream according to the frequency of using DCG codewords when the DC suppression control is performed using the DC control conversion table of the present invention. When a codeword in the DC control conversion table is used for each 6 byte source data (code rate 8/15.33), PSD is −32.41 dB at a $10^{-4}$ frequency. When a codeword in the DC control conversion table is used for each 5 byte source data (code rate 8/15.4), PSD is −34.2 dB at a $10^{-4}$ Hz. When a codeword in the DC control conversion table is used for each 4 byte source data (code rate 8/15.5), PSD is −2589 dB in a $10^{-4}$ Hz. Accordingly, it is shown that more frequently performing the DC suppression control leads to a better result. When the auxiliary code group ACG is used, about a 3 dB DC suppression is additionally achieved.

Figure 19:
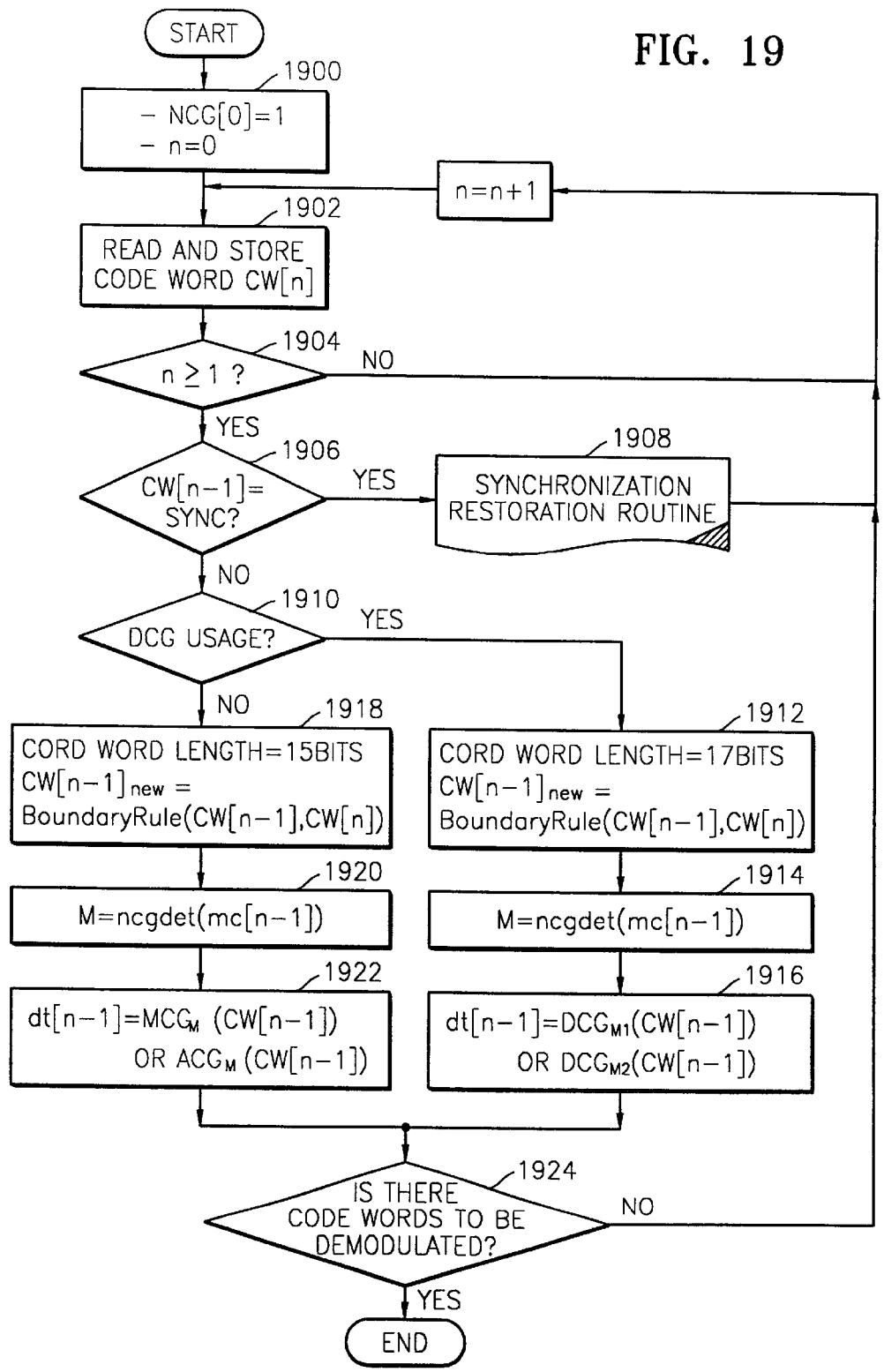
FIG. 19 is a flowchart of a code demodulation method of the present invention.

FIG. 19 is a flowchart of a code demodulation method according to another embodiment of the present invention. The code demodulation method shows a method of demodulating a codeword detected from an optical information storage medium on which converted codewords described above are recorded. First, the index of a conversion group of an initial codeword to be demodulated is determined. The conversion code group index of the initial codeword should be the same as the index of the conversion code group which was applied to the initial source data in modulation. In the code conversion example described above, since the conversion code group index when the initial data is modulated is 1, the index of a codeword to be demodulated can be determined as 1 (NCG[0]=1). After determining the index of the initial codeword, the codeword count is initialized as 0 (n=0) in operation 1900.

A codeword is read and then stored as a CW[n] in operation 1902. Then, in operation 1904, it is determined whether or not the number of the read codewords is equal to or greater than 2, that is, it is determined whether n is equal to or greater than 1. If n is equal to or greater than 1, it is first determined in operation 1906 whether the codeword CW[n−1] is a synchronization code sync. If it is a synchronization code sync, a synchronization restoration routine is performed in operation 1908. If it is not a synchronization code sync, it is determined in step 1910 whether the DC control conversion table is applied to the codeword, that is, whether the DC suppression control is performed when conversion to CW[n−1] is performed. If the DC control conversion table has to be used, the length of the codeword is 17 bits.

If a current codeword CW[n−1], which is currently to be restored, and a following codeword CW[n], which is to be restored immediately after the restoration of the codeword CW[n−1], form a code stream, it is determined whether the code stream has a shape of a new codeword $CW_{NEW}[n-1]$ which is converted by applying the boundary rule as shown in FIG. 12, and if the code stream has the above shape, the original code is restored in operation 1912. According to the number of the end zeros of a codeword CW[n−2] which precedes the current codeword CW[n−1], it is determined in operation 1914 the index M of the code group to which the current codeword CW[n−1] belongs (M=ncgdet(mc[n−1])). The current codeword CW[n−1] to be restored is found in the DC control code group pair ($DCG_M1$ and $DCG_M2$) of the index which is determined above, and is restored to data dt[n−1] corresponding to the codeword (dt[n−1]=$DCG_{M1}$(CW[n1]) or $DCG_{M2}$(CW[n−1])) in operation 1916.

If it is determined in operation 1910 that the current codeword CW[n−1] is not converted by using the DC control conversion table, the length of the codeword is set to 15 bits. If the current codeword CW[n−1] which is currently to be restored and the following codeword CW[n] which is to be restored immediately after the restoration of the current codeword CW[n−1] form a code stream, it is determined whether or not the current code stream has a shape of the new codeword $CW_{NEW}[n-1]$ which is converted by applying the boundary rule as in FIG. 12, and if the code stream has the shape, the original code is restored in operation 1918. According to the number of the end zeros of the codeword CW[n−2] which precedes the current codeword CW[n−1], it is determined in operation 1920 the index M of the code group to which the current codeword CW[n−1] belongs (M=ncgdet(mc[n−1])).

The current codeword CW[n−1] to be restored is found in the main code group and the auxiliary code group, of which the index is determined above, and is restored to data dt[n−1] corresponding to the codeword (dt[n−1]=$MCG_M$(CW[n−1]) or $ACG_M$(CW[n−1])) in operation 1916. Then, it is determined whether or not there are codewords to be restored in operation 1924. If there are codewords to be restored, n increases in step 1926 and then the steps following operation 1902 are performed gain. If there are no codewords to be restored, the demodulation process stops.

According to the present invention, in a code conversion, a regular DC suppression control is performed and a code stream path is selected so that more DC components in the code stream can be efficiently removed.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. A codeword conversion method of converting source data into a codeword to be recorded on a storage medium, the method comprising:

receiving first and second source data;

determining whether a direct current (DC) control to control a DC component of a code stream has to be performed, and if the DC control has to be performed, converting the first source data into a first codeword from one of code groups having codewords formed for the DC control;

if DC control is not to be performed, converting the first source data into a main codeword corresponding to the first source data from a main code group formed according to a data format to be recorded on the storage medium;

determining another one of the code groups and converting the second source data into a second codeword from another one of the code groups according to the number of end zeros of the first codeword; and examining a boundary between codewords of the code stream formed by adding the second codeword and the first codeword, and if the boundary does not satisfy a predetermined condition, changing the first codeword in a new first codeword.

2. The method of claim 1, further comprising:

setting a time for the DC control of the code stream so that the DC control is cyclically performed for the first source data.

3. The method of claim 1, wherein the determining of another one of the code groups comprises selecting the second codeword from another one of the code groups when the number of lead zeros satisfies a predetermined run length condition according to the number of end zeros of the first codeword to convert the second source data into the second codeword.

4. The method of claim 1, wherein the controlling of the DC control comprises:

selecting one of two DC control codeword groups, each group having one of codewords of a codeword pair, the codewords of the codeword pair having opposite parities and being included in the same DC control code group.

5. The method of claim 1, wherein when DC control is not to be performed, the converting of the first source data into a normal codeword comprises:

selecting one of a main code group having main codewords corresponding to all source data and an auxiliary code group for the DC control having auxiliary codewords that have the same length of the end zeros as the main codewords of the main code group.

6. The method of claim 5, wherein the selecting of one of the main code group and the auxiliary code group comprises:

determining that a length of the codewords of the main code group and auxiliary code group for the DC control when the DC control is not performed is 15 bits long and that a length of the codeword selected when the DC control has to be performed is 17 bits long.

7. The method of claim 1, wherein the changing of the first codeword comprises:

if the boundary does not satisfy a predetermined condition after the boundary of the codewords of the code stream is examined, determining that a number of end zeros of the first codeword is 0 and that a number of lead zeros of the second codeword is 1.

8. A code conversion method of controlling a suppression of a DC component contained in a code stream when source data is converted into a codeword to be recorded on a storage medium, the method comprising:

determining a control time to suppress the DC component of the code stream having the codeword;

performing a code conversion at each control time by branching a pair of branch code streams from the code stream, one of the branch code streams extending in a first direction where a running digital sum (RDS) of the code stream increases, and the other one of the branch code streams extending in a second direction where the RDS of the code stream decreases; and selecting one of the code streams that has a most bounded path around RDS '0' from the branch code streams generated each control time.

9. The method of claim 8, wherein the selecting of the one of the branch code streams comprises:

selecting the one of the branch code streams having a smallest value when maximum values of absolute values of respective RDSs of the branch code streams are compared with each other.

10. The method of claim 9, wherein the selecting of the one of the branch code streams comprises:

if the branch code streams have the same first maximum value of the absolute values of respective RDSs of the branch code streams, selecting a second maximum value that is not the first maximum value of the absolute values of upper and lower limits of the branch code streams but selected from the absolute values of the upper limit and the lower limit of each branch code stream; and after comparing the selected second maximum values of the branch code streams, selecting the one of the branch code streams having a smaller value in the second maximum values.

11. The method of claim 10, wherein the selecting of the one of the branch code streams comprises:

if the branch code streams have the same first maximum value and the same second maximum value, comparing the sums of the absolute values of the RDS of respective code streams and selecting the one of the branch code streams having a smaller one of the sums of the absolute values of the RDS of the respective code streams.

12. The method of claim 11, wherein the selecting of the one of the branch code streams comprises:

if the branch code streams have the same first maximum value, the same second maximum value, and the same sum of the absolute value of the RDS, selecting the one of the branch code streams having a highest one of frequencies of a zero crossing of the RDS values of respective code streams after the frequencies are compared with each other.

13. A codeword demodulation method of demodulating a codeword stored in a storage medium, the method comprising:

reading the codeword;

if a DC suppression control is performed in a code conversion, finding a code group corresponding to the codeword from a pair of first code conversion tables each having one of a pair of opposite parity codewords, finding source data corresponding to the codeword from the found code group, and demodulating the codeword to the source data; and if the DC suppression control is not performed in the code conversion, finding the source data corresponding to the codeword from a second code conversion table.

14. The method of claim 13, wherein the first code conversion tables and the second code conversion table have 17 bits long codewords and 15 bits long codewords, respectively.

15. The method of claim 14, wherein the finding of the source data comprises:

selecting the second code conversion table between a main conversion table, which has groups classified by the number of end zeros and codewords corresponding to all possible source data, and an auxiliary conversion table which is formed by surplus codewords of the groups of the main conversion table to perform the DC suppression control.

16. A codeword conversion method of converting source data into a codeword to be recorded on a storage medium, the method comprising:

determining whether a DC suppression control of suppressing a DC component of the code stream is performed when the source data is converted into the codeword to form the code stream;

converting the source data into the codeword by selecting a first code group having first codewords of a first length when the DC suppression control is not performed; and converting the source data into the codeword by selecting a second code group having second codewords of a second length being longer than the first length when the DC suppression control is not performed.

17. The method of claim 16, wherein the first codewords and the second codewords corresponds to the source data having 8 bits.

18. The method of claim 16, wherein the first length is 17 bits long, and the second length is 15 bits long.

19. The method of claim 16, further comprising:

generating the first code group having a first main code group having first codewords each having 15 bits.

20. The method of claim 19, wherein the selecting of the first code group comprises:

selecting one of the first codewords from the main code group when the source data is converted into the codeword.

21. The method of claim 16, wherein the selecting of the first code group comprises:

generating an auxiliary code group having first codewords each having 15 bits; and selecting one of the first codewords from the auxiliary code group when the source data is converted into the codeword.

22. The method of claim 16, wherein the selecting of the second code group comprises:

generating a main code group, a DC control code group for the DC suppression control, and an auxiliary code group for the DC suppression control to form the second code group.

23. The method of claim 22, wherein the selecting of the second code group comprises:

selecting one of the second codewords from the main code group, the DC control code group, and the auxiliary code group, the second codewords each having 17 bits.

24. The method of claim 22, wherein the DC control code group comprises two sets of codewords, the codeword of each set having one of two different opposite parity bits, each set corresponding to the source data.

25. The method of claim 16, wherein a ratio between the first codewords and the second codewords is defined by a formula of $8/(15+\alpha)$, and a is a value between 1 and 0.

26. The method of claim 16, further comprising:

generating a control time to perform the DC suppression control in every predetermined time period; and converting the source data into the codeword by selecting the second code group in response to the control time.

27. The method of claim 16, further comprising:

receiving second source data;

generating an index indicating another second code group having other second codewords; and converting the second source data into another second codeword from other second codewords of another second code group.

28. The method of claim 16, further comprising:

converting second source data into a second codeword;

generating a plurality of indexes each representing a corresponding characteristic of adjacent codeword and the second codeword in the code stream; and converting the second source data into the second codeword from the second code group in response to the index.

29. The method of claim 28, wherein the generating of the indexes comprises:

dividing the second code group into a number of sub code groups, the number of sub groups being the same as the number of the indexes; and converting the second source data into the second codeword by selecting one of the sub code groups in response to the one of the indexes.

30. The method of claim 28, wherein the generating of the indexes comprises:

dividing the second code group into main, DC control, and auxiliary code groups;

dividing each of the main code group, the DC control code group, and the auxiliary code group into a number of sub main code groups, sub DC control code groups, and sub auxiliary code groups, the number of the main code groups, the sub DC control code groups, and the sub auxiliary code groups being the same as the number of the indexes; and converting the second source data into the second codeword by selecting corresponding ones of the sub main code groups, the sub DC control code groups, and the sub auxiliary code groups, respectively.

31. The method of claim 28, wherein the generating of the indexes comprises:

generating one of the indexes in response to the number of end zeros contained in the codeword.

32. The method of claim 16, further comprising:

receiving second source data;

converting the second source data into a second codeword; and changing the codeword converted from the source data into a new first codeword when the number of zeros between the second codeword and the codeword is less than 2.

* * * * *

UNITED STATES PATENT AND TRADEMARK OFFICE
CERTIFICATE OF CORRECTION

PATENT NO.    : 6,696,991 B2
DATED         : February 24, 2004
INVENTOR(S)   : Jae-seong Shim et al.

It is certified that error appears in the above-identified patent and that said Letters Patent is hereby corrected as shown below:

Column 17,
Line 33, change "a" (first occurrence) to -- α --.

Signed and Sealed this

Twenty-second Day of June, 2004

JON W. DUDAS
*Acting Director of the United States Patent and Trademark Office*